US007610553B1

(12) United States Patent
Jacklin et al.

(10) Patent No.: US 7,610,553 B1
(45) Date of Patent: Oct. 27, 2009

(54) METHOD AND APPARATUS FOR REDUCING DATA EVENTS THAT REPRESENT A USER'S INTERACTION WITH A CONTROL INTERFACE

(75) Inventors: Kelly B. Jacklin, Cupertino, CA (US); Alan C. Cannistraro, San Francisco, CA (US); Roger A. Powell, Burlingame, CA (US)

(73) Assignee: Apple Inc., Cupertino, CA (US)

(*) Notice: Subject to any disclaimer, the term of this patent is extended or adjusted under 35 U.S.C. 154(b) by 628 days.

(21) Appl. No.: 10/407,976

(22) Filed: Apr. 5, 2003

(51) Int. Cl.
*G06F 3/16* (2006.01)
*G06F 3/18* (2006.01)

(52) U.S. Cl. ....................... 715/727; 345/156; 345/157; 715/700; 715/728; 715/788; 715/804

(58) Field of Classification Search ................. 715/700, 715/727, 728, 788, 804; 345/157, 156
See application file for complete search history.

(56) References Cited

U.S. PATENT DOCUMENTS 4,713,771 A * 12/1987 Crop ........................... 702/67
4,849,880 A * 7/1989 Bhaskar et al. ............. 717/109
4,935,963 A * 6/1990 Jain ........................... 704/207
5,077,541 A * 12/1991 Gilbert ....................... 330/284
5,079,720 A * 1/1992 Sinclair ...................... 345/443
5,191,320 A * 3/1993 MacKay ..................... 345/184
5,204,969 A * 4/1993 Capps et al. ................ 704/278
5,226,000 A * 7/1993 Moses et al. ................ 708/313
5,262,958 A * 11/1993 Chui et al. ..................... 702/75
5,307,455 A * 4/1994 Higgins et al. .............. 345/440
5,371,842 A * 12/1994 Easton et al. ............... 345/440
5,375,201 A * 12/1994 Davoust ...................... 715/201
5,428,730 A * 6/1995 Baker et al. ................. 715/740
5,485,564 A * 1/1996 Miura ......................... 345/440
5,519,818 A * 5/1996 Peterson ..................... 345/642
5,550,964 A * 8/1996 Davoust ...................... 345/440
5,586,216 A * 12/1996 Degen et al. ................ 704/276
5,657,221 A * 8/1997 Warman et al. ............... 700/83
5,675,778 A * 10/1997 Jones ............................ 701/1
5,712,661 A * 1/1998 Jaeger ......................... 345/170
5,764,179 A * 6/1998 Tsurumoto .................. 341/176
5,805,145 A * 9/1998 Jaeger ......................... 345/172
5,805,146 A * 9/1998 Jaeger et al. ................ 345/172
5,825,899 A * 10/1998 Yamaguchi et al. ......... 381/94.4
5,874,950 A * 2/1999 Broussard et al. ......... 715/500.1
5,966,125 A * 10/1999 Johnson ....................... 715/835
6,020,881 A * 2/2000 Naughton et al. ........... 715/740

(Continued)

OTHER PUBLICATIONS

Sonic Foundary Inc. et al. "Acid 4.0 User Manual" 2002.*

(Continued)

*Primary Examiner*—Steven B Theriault
(74) *Attorney, Agent, or Firm*—Adeli & Tollen LLP

(57) ABSTRACT

A method for reducing data events representing a parameter of a signal as adjusted by a user through a control interface during a time period. The method includes receiving a series of data events where each data event has a parameter value of the signal and a time-based value associated with the parameter value that corresponds to an instance in time during the time period. The method further includes processing three data events in the series of data events and eliminating one of the three data events based in part on the parameter values of the three data events relative to each other.

64 Claims, 19 Drawing Sheets

U.S. PATENT DOCUMENTS 6,029,181 A * 2/2000 Milakovich et al. ......... 715/523
6,064,401 A * 5/2000 Holzman et al. ............ 345/440
6,081,266 A * 6/2000 Sciammarella .............. 715/727
6,144,800 A * 11/2000 Kobayashi .................. 386/114
6,154,221 A * 11/2000 Gangnet ..................... 345/442
6,163,789 A * 12/2000 Liu ............................ 708/323
6,167,350 A * 12/2000 Hiramatsu et al. ............ 702/67
6,256,027 B1 * 7/2001 Jeong et al. ................. 715/788
6,266,644 B1 * 7/2001 Levine ....................... 704/503
6,317,117 B1 * 11/2001 Goff ........................... 345/156
6,359,632 B1 * 3/2002 Eastty et al. ................ 715/716
6,377,891 B1 * 4/2002 Gilbert ....................... 701/213
6,424,939 B1 * 7/2002 Herre et al. ................. 704/219
6,469,702 B1 * 10/2002 Sheasby et al. ............. 345/442
6,483,451 B1 * 11/2002 Koyanagi .................... 341/144
6,490,359 B1 * 12/2002 Gibson ....................... 381/119
6,675,054 B1 * 1/2004 Ruberg ........................ 700/94
6,704,012 B1 * 3/2004 Lefave ....................... 345/440
6,882,735 B2 * 4/2005 Staley ........................ 381/106
6,898,291 B2 * 5/2005 Gibson ....................... 381/119
6,911,959 B1 * 6/2005 Morrish ....................... 345/35
6,941,331 B2 * 9/2005 Bezryadin et al. ........... 708/290
6,959,220 B1 * 10/2005 Wiser et al. ................... 700/94
6,977,653 B1 * 12/2005 Cleary et al. ................ 345/440
6,999,826 B1 * 2/2006 Zhou et al. ..................... 700/94
7,043,423 B2 * 5/2006 Vinton et al. ............... 704/205
7,053,669 B1 * 5/2006 Memmler et al. ............. 327/58
7,058,126 B1 * 6/2006 Allred ........................ 375/232
7,084,872 B2 * 8/2006 Etgen et al. ................. 345/440
7,123,728 B2 * 10/2006 King et al. .................... 381/98
7,224,853 B1 * 5/2007 Moni ......................... 382/300
7,319,764 B1 * 1/2008 Reid et al. .................. 381/104
2002/0175931 A1 * 11/2002 Holtz et al. ................. 345/716
2002/0178006 A1 * 11/2002 Suzuki et al. ............... 704/258
2003/0035555 A1 * 2/2003 King et al. .................. 381/103
2003/0117431 A1 * 6/2003 Moriwake et al. ........... 345/723
2003/0149603 A1 * 8/2003 Ferguson et al. ............... 705/7
2003/0223017 A1 * 12/2003 Utsunomiya et al. ........ 348/726
2004/0071299 A1 * 4/2004 Yoshino ....................... 381/98
2004/0199395 A1 * 10/2004 Schulz ....................... 704/278
2005/0201572 A1 * 9/2005 Lindahl et al. .............. 381/103
2005/0211075 A1 * 9/2005 Desai et al. ................... 84/645
2005/0262451 A1 * 11/2005 Remignanti et al. ......... 715/833
2006/0114979 A1 * 6/2006 Pedersen et al. ............ 375/229

OTHER PUBLICATIONS

Avid Technology Inc. et al. Avid Express DV 3.5 User Guide, 2002.*

Avid Technology Inc. et al. Avid Express DV 3.5 Getting Started Guide 2002.* http://en.wikipedia.org/ author unknown "Digital Audio Workstation" retrieved 2009.* http://en.wikipedia.org/ author unknown "Final_cut_pro" retrieved 2008.* m-audio.com et al. "Ablteton Live 2 Audio Sequenceer Revolutionizes Recording and Performance" Nov. 2002.*

Sony Pictures Digital Inc. et al "Acid Screenblast 4.0" 2003.*

Ableton.ag et al. "Ableton Live 2.1 User Manual" 2002.*

* cited by examiner

METHOD AND APPARATUS FOR REDUCING DATA EVENTS THAT REPRESENT A USER'S INTERACTION WITH A CONTROL INTERFACE

FIELD OF THE INVENTION

The invention is directed towards a method and apparatus for reducing data events that represent a user's interaction with a control interface.

BACKGROUND OF THE INVENTION

Gain control interfaces that allow a user to modify a gain level of an audio signal are often used in multimedia applications. A gain control interface typically contains a control icon that slides across a scale that defines a succession of gain levels (usually measured in dB). By sliding the position of the control icon across the scale, as an audio track is playing, the user can modify the gain level of the audio track during the play.

The distance between two gain levels on the scale can be measured by a number of pixels that are displayed between the two gain levels. A pixel resolution can be defined as a number of pixels per difference in gain levels. Conventionally, the scale is divided into two or more regions where each region has a linear pixel resolution (i.e., as the difference in gain levels increases, the number of pixels between the gain levels increase linearly). For example, in one region of the scale, 50 pixels may be displayed between every 2 dB difference in gain levels. In a second region of the scale, 30 pixels may be displayed between every 2 dB difference in gain levels.

The conventional approach creates a problem, however, since the user does not perceive the gain (i.e., volume) of an audio signal on a linear scale. In other words, conventional gain control interfaces do not allow a user to adjust the gain level of the audio signal in an intuitive manner. Therefore, there is a need for a gain control interface that allows the user to intuitively adjust gain levels of an audio signal in a multimedia application.

The user's adjustments, over a specific time period, of the gain levels of an audio signal can be captured as numerous data events (i.e., a stream of data events) by a multimedia application employed by the user. Each data event has a gain level value that is specified by the user at an instance in time during the time period. A multimedia application uses the data events to provide a graphical representation of the stream of data events during the specific time period. The multimedia application typically positions the data events across a gain level axis and a time-based axis of the graphical representation. A user can then modify the gain levels of the audio signal during the specific time period by changing the position of the data events in the graphical representation of the stream of data events.

Conventionally, a multimedia application will produce a graphical representation of the stream of data events that contains numerous and unnecessary data events that consumes resources of a computer executing the multimedia application. Having numerous and unnecessary data events also makes manipulation of the data events in the graphical representation difficult and cumbersome since numerous data events must be re-positioned to modify the gain levels of the audio signal during a particular time span. For example, in the graphical representation, a conventional multimedia application may display numerous data events in a relatively straight line across a particular time span even though only two data events (the data events at the beginning and ending of the relatively straight line) are adequate. Therefore, in using the conventional multimedia application, a user that wishes to modify the gain levels of the audio signal during the particular time span must re-position each of the numerous data events that are displayed in a relatively straight line across the particular time span.

Therefore, there is a need for a method that reduces the number of data events representing the user's interaction with the gain control interface while still adequately representing the user's interaction with the gain control interface.

SUMMARY OF THE INVENTION

Some embodiments of the invention provide a method for reducing data events representing a parameter of a signal as adjusted by a user through a control interface during a time period. The method includes receiving a series of data events where each data event has a parameter value of the signal and a time-based value associated with the parameter value that corresponds to an instance in time during the time period. The method further includes processing three data events in the series of data events and eliminating one of the three data events based in part on the parameter values of the three data events relative to each other.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for displaying a gain control interface having a gain level display with non-linear gain levels. The embodiments described below relate to the gain level of an audio signal. One of ordinary skill in the art, however, will realize that the invention can relate to a variety of parameters relating to different types of signals where values of the parameter are to be displayed non-linearly.

Figure 1:
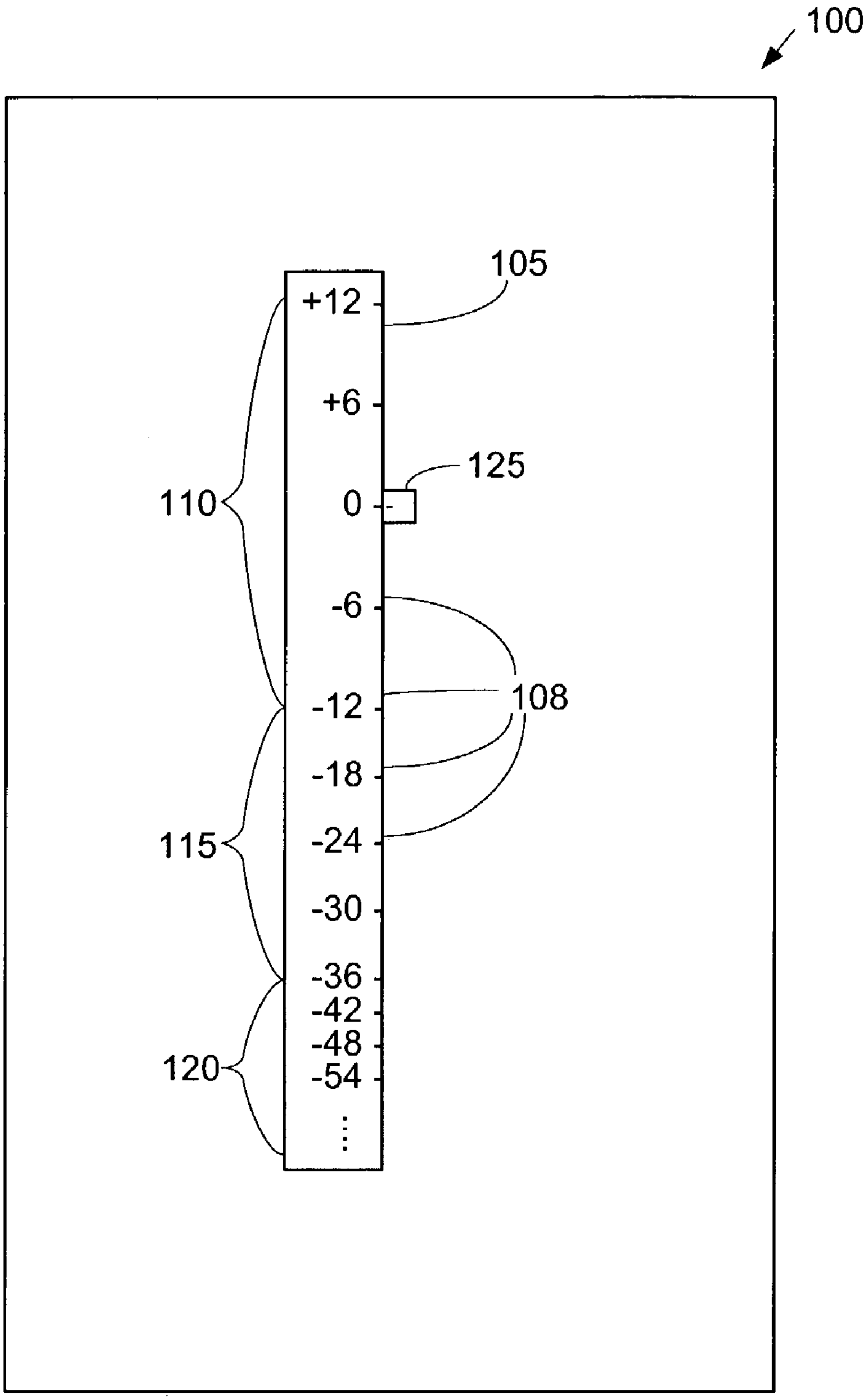
Figure 1 (Prior Art)
FIG. 1 shows an example of a gain control interface of the prior art.

FIG. 1 shows an example of a gain control interface 100 of the prior art. The gain control interface 100 is typically used in a multimedia application. The gain control interface 100 is part of a graphical user interface ("GUI") with which a user can interact through traditional GUI operations, such as click operations (e.g., to select an item), click-and-drag operations (e.g., to move an item), etc.

The gain control interface 100 contains a gain level display 105 and a control icon 125. The gain level display 105 is comprised of a series of pixels and displays a succession of gain level values 108 (typically in dB units) at different pixels. The succession of gain level values 108 correspond to various gain levels to be produced by the multimedia application when the control icon 125 is set adjacent to the gain level values 108 by the user. The user can adjust the position of the control icon 125 along the gain level display 105 through traditional GUI operations.

In the example shown in FIG. 1, the gain level display 105 is divided into three regions: a first region 110, a second region 115, and a third region 120. Throughout each region, there is a linear pixel resolution so that as the difference in gain levels increases, the number of pixels between the gain levels increase linearly. In the example shown in FIG. 1, the gain level values 108 are evenly spaced in terms of the number of pixels that lie between a given difference in gain level values. For example, in the first region 110, the number of pixels that lie between +12 dB and +6 dB (the gain level values having a difference of 6 dB) is the same number of pixels that lie between +6 dB and 0 dB (the gain level values having the same difference of 6 dB). As another example, in the second region 115, the number of pixels that lie between −12 dB and −18 dB (the gain level values having a difference of 6 dB) is the same number of pixels that lie between −18 dB and −24 dB (the gain level values having the same difference of 6 dB).

In the example shown in FIG. 1, a different linear equation is applied in each region to derive an even spacing of gain levels throughout the region. For example, the linear equation used for the first region 110 may produce 50 pixels for every 6 dB of gain difference and the linear equation used for the second region 115 may produce 25 pixels for every 6 dB of gain difference.

Therefore, the gain control interface 100 of the prior art is displayed using a linear relationship between the difference in gain levels and the number of pixels displayed between the gain levels. A user, however, does not perceive the gain of an audio signal on a linear scale. Therefore, the gain control interface 100 of the prior art does not allow the user to adjust the gain level of the audio signal in an intuitive manner.

Figure 2:
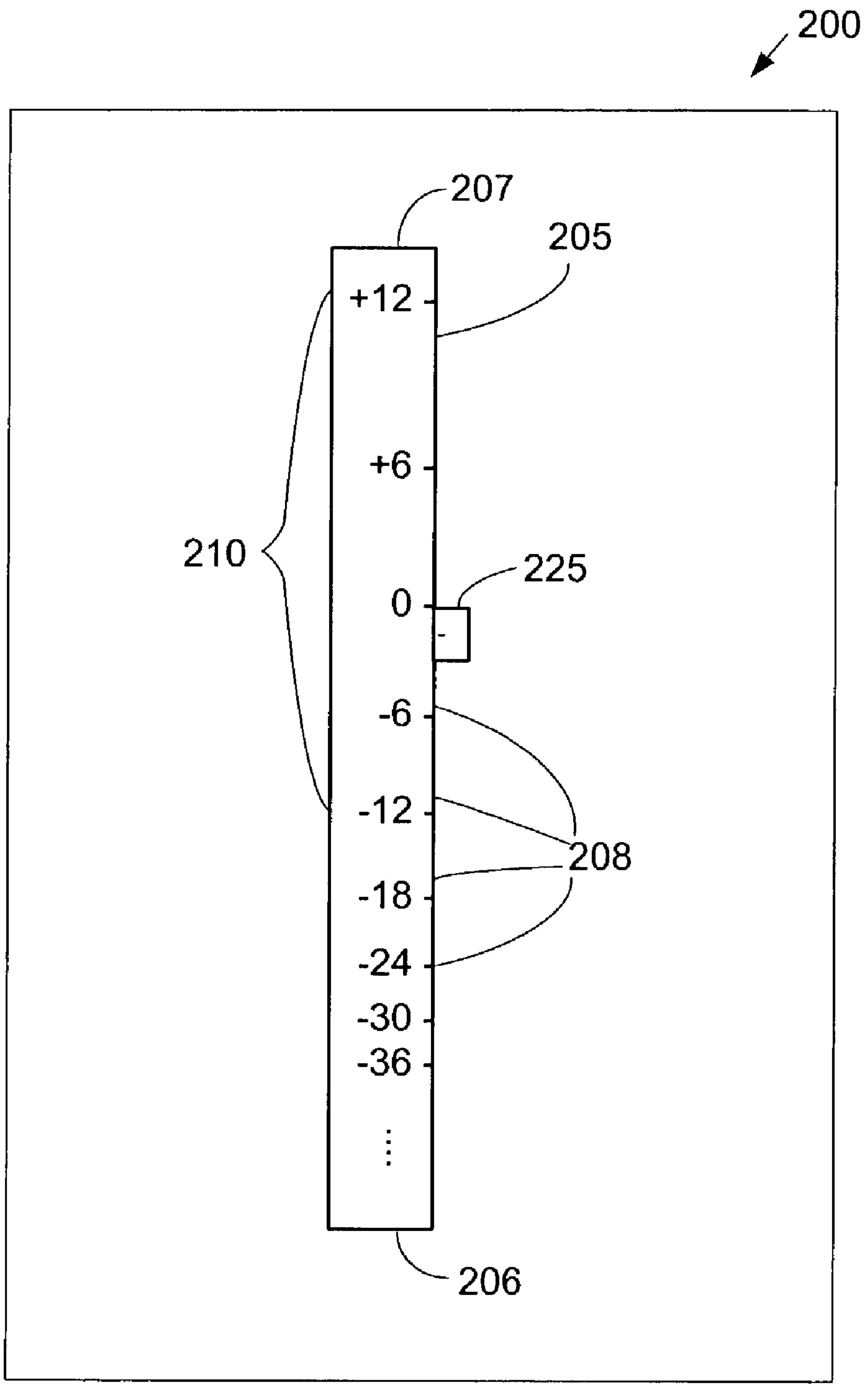
FIG. 2 shows an example of a gain control interface in accordance with the present invention.

FIG. 2 shows an example of a gain control interface 200 in accordance with the present invention. The gain control interface 200 is typically used as part of a multimedia application where a user can interact with the gain control interface 200 through a GUI. The gain control interface 200 contains a gain level display 205 and a control icon 225. The gain level display 205 is comprised of a series of pixels and displays a succession of gain level values 208 (typically in dB units) at different pixels. The succession of gain level values 208 correspond to various gain levels to be produced by the multimedia application when the control icon 225 is set adjacent to the gain level values 208 by the user.

Throughout a region of the gain level display 205, the gain level values 208 are not evenly spaced in terms of the number of pixels that lie between a given difference in gain level values 208. For example, in a first region 210, the number of pixels that lie between +12 dB and +6 dB (the gain level values having a difference of 6 dB) is not the same number of pixels that lie between +6 dB and 0 dB (the gain level values having the same difference of 6 dB). As another example, the number of pixels that lie between −12 dB and −18 dB (the gain level values having a difference of 6 dB) is not the same number of pixels that lie between −18 dB and −24 dB (the gain level values having the same difference of 6 dB).

Therefore, it can be said that the pixel resolution is not the same throughout a region of the gain level display 205 and that the pixel resolution is continuously changing along the gain level display 205. The gain level values 208 are displayed using a non-linear relationship between pixels of the gain level display 205 and the gain level value 208 displayed. In some embodiments, the non-linear relationship is a logarithmic relationship. Since gain of an audio signal is perceived by humans on a logarithmic scale, the gain control interface 200 of the present invention allows intuitive adjustment of gain levels by a user.

The gain level display 205 is comprised of a series of pixels, each pixel having an associated pixel offset value. The gain level display 205 has a first end 206 associated with a first end pixel offset value and a second end 207 associated with a second end pixel offset value. The first end pixel offset value is set to equal 0. In an alternative embodiment, the first end pixel offset value is set to equal any other number. The first end pixel offset value is lower in value than the second end pixel offset value A range of pixel offset values spans from the first end pixel offset value through the second end pixel offset value. The second end pixel offset value and the range of pixel offset values are relative to the first end pixel offset value and do not change in value when the position of the gain control interface 200 changes relative to the display in which it is displayed.

A gain level value for each pixel offset value in the range of pixel offset values is calculated using a logarithmic relationship (as discussed below in relation to FIGS. 3 and 4) whereby a difference between two pixel offset values of two gain level values having a gain level difference is not equal to a difference of two pixel offset values of any other two gain level values having the same gain level difference.

Figure 3:
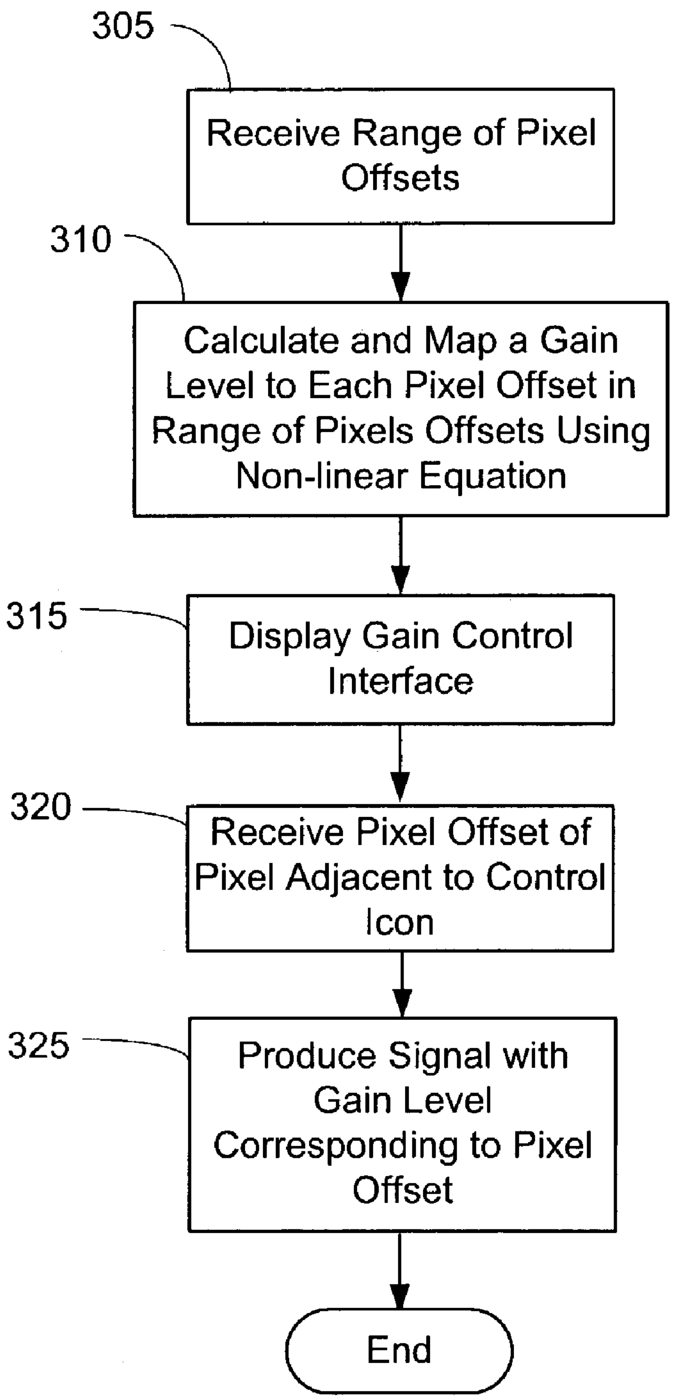
FIG. 3 illustrates a general process for displaying a gain control interface using a non-linear equation.

FIG. 3 illustrates a general process for displaying a gain control interface 200 using a non-linear equation. This process may be performed, for example, by a multimedia application.

The process begins when a range of pixel offset values of a gain level display 205 of a gain control interface 200 is received (at 305). The range of pixel offset values span from a first end pixel offset value associated with a first end 206 of the gain level display 205 through a second end pixel offset value associated with a second end 207 of the gain level display 205. The range of pixel offset values may be a contiguous range of values or may be a non-contiguous range of values. The first end pixel offset value is lower in value than the second end pixel offset value.

The process then calculates and maps (at 315) a gain level value to each pixel offset value in the range of pixels offset values using a non-linear equation (as discussed below in relation to FIG. 4). The process displays (at 315) the gain control interface 200 containing the gain level display 205 and a control icon 225. The gain level display 205 displays a succession of gain level values 208 where a gain level value mapped (at 315) to a pixel offset value is displayed at a pixel in the gain level display 205 having the pixel offset value. The succession of gain level values 208 may include any of the gain level values mapped (at 315) to a pixel offset value or any subset of the gain level values mapped (at 315) to a pixel offset value. In the example shown in FIG. 2, the succession of gain level values 208 includes +12, +6, 0, −6, −12, etc.

The process then receives (at 320) a pixel offset value of a pixel of the gain level display 205 that is adjacent to the location of the control icon 225 in the gain control interface 200. The location of where the control icon 225 is displayed relative to the gain level display 205 can be adjusted by a user through traditional GUI operations. The process produces (at 325) a signal having a gain level value that is mapped (at 315) to the received pixel offset value.

Figure 4:
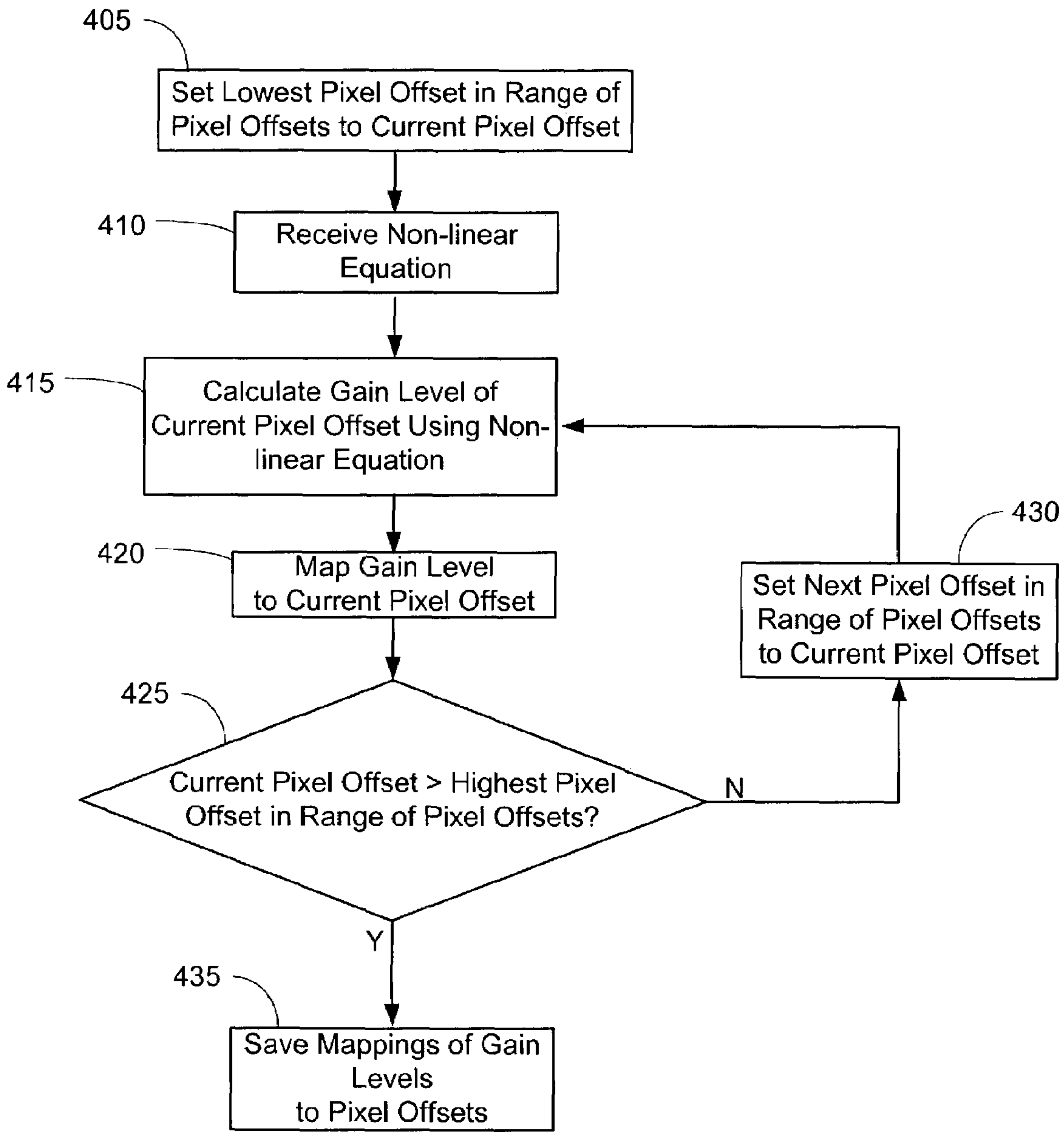
FIG. 4 illustrates a process for calculating and mapping a gain level value to each pixel in a gain level display of a gain control interface.

FIG. 4 illustrates a process for calculating and mapping a gain level value to each pixel in a gain level display 205 of a gain control interface 200. This process may be performed, for example, by a multimedia application.

The process starts when a range of pixel offset values of a gain level display 205 of a gain control interface 200 is received, the range of pixel offset values having a lowest pixel offset value and a highest pixel offset value. The process then sets (at 405) the lowest pixel offset value in the range of pixel offset values as a current pixel offset value. In an alternative, any other pixel offset value in the range of pixel offset values is set (at 405) as a current pixel offset value.

A non-linear equation is then received (at 410). In some embodiments, the non-linear equation is a logarithmic equation. In other embodiments, the non-linear equation is a logarithmic equation being defined by the following formula:

$$\text{gain level }[i]=(i/x)\hat{}(20*k/\log_{10}(e))$$

where i=a pixel offset value, x=h/(10^(m/k)), h=height (in pixels) of the gain level display 205, m=a predetermined maximum gain level value, and k=a predetermined scaling value. The height (h) of the gain level display 205 can be determined by a difference between the highest and lowest pixel offset values of the gain level display 205. The value of m is determined by the maximum gain level value to be displayed in the gain level display 205. And the value of k is a scaling value that changes the compression or density of the pixel resolution around a gain level value of 0 dB.

The process then calculates (at 415) a gain level value of the current pixel offset value using the received non-linear equation and maps (at 420) the calculated gain level value to the current pixel offset value. The process checks (at 425) if the current pixel offset value is greater than the highest pixel offset value in the range of pixel offset values.

If the process determines (at 425—No) that the current pixel offset value is not greater than the highest pixel offset value, the process sets (at 430) the next pixel offset value in the range of pixel offset values as the current pixel offset value. The process continues and calculates (at 415) a gain level value of the current pixel offset value using the received non-linear equation. If the process determines (at 425—Yes) that the current pixel offset value is greater than the highest pixel offset value, the process saves (at 435) the mappings of the gain level values to the pixel offset values in the range of pixel offset values.

The embodiments described above provide a method for displaying a gain control interface having a gain level display with non-linear gain levels. These embodiments relate to the gain level of an audio signal. One of ordinary skill in the art, however, will realize that the invention can relate to a variety of parameters relating to different types of signals where values of the parameter are to be displayed non-linearly.

The embodiments described below provide a method for reducing data events representing a parameter of a signal adjusted by a user through a control interface during a time period. These embodiments often relate to a gain level parameter of an audio signal. One of ordinary skill in the art, however, will realize that the invention can relate to any variety of parameters relating to different types of signals. For example, the invention may relate to a panning level parameter of an audio signal. As another example, the invention may relate to a contrast or brightness level parameter of a video signal. In effect, the invention may relate to any time-based parameter of a signal.

As stated above, the user's adjustments, over a specific time period, of the gain levels of an audio signal through the gain control interface can be captured through numerous data events (i.e., a stream of data events). The stream of data events represent the gain level of the audio signal as adjusted by the user through the gain control interface during the time period. Each data event contains a gain level value and a time-based value associated with the gain level value. The time-based value reflects an instance in time when the user adjusted the audio signal to the associated gain level value during the time period.

Figure 5:
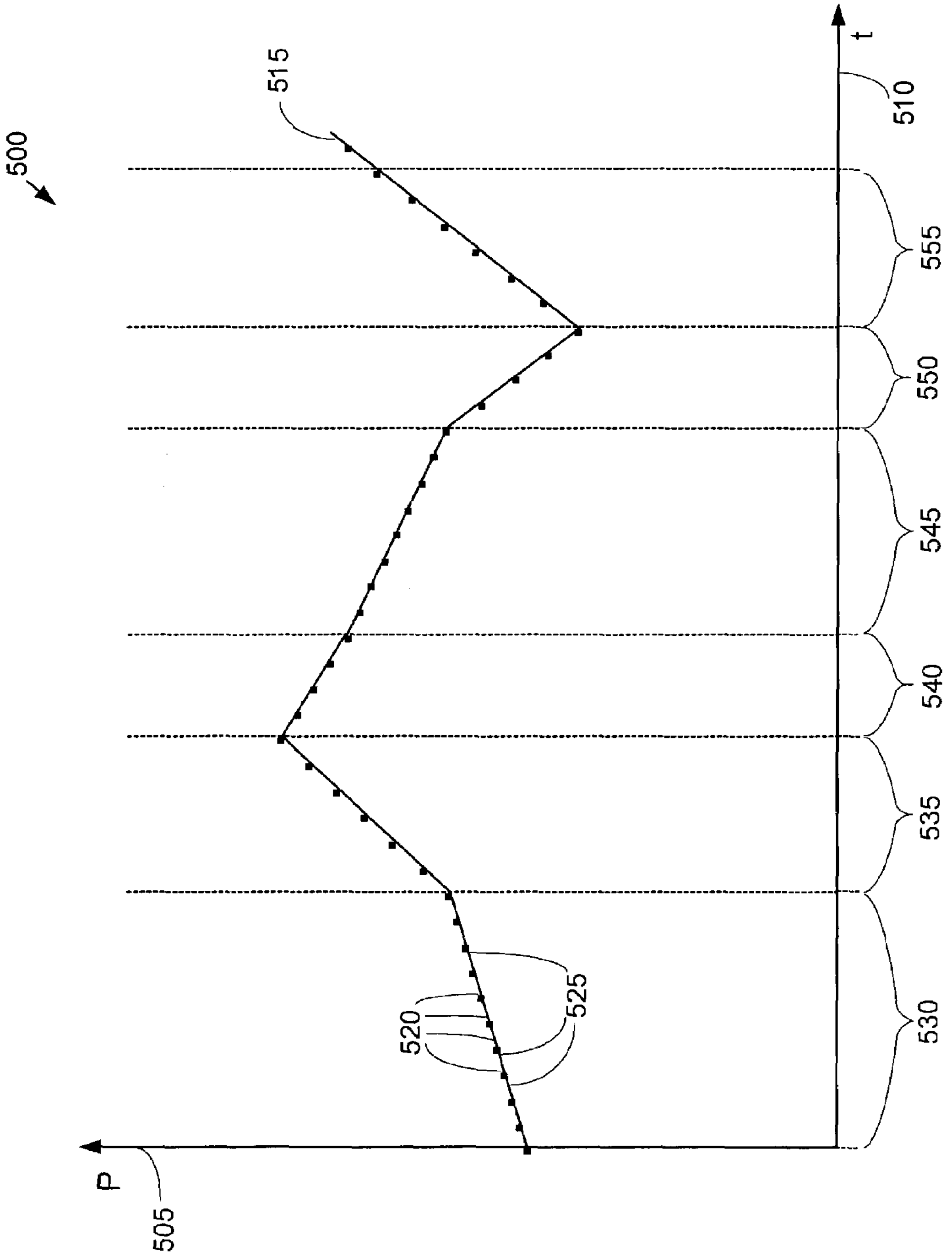
Figure 5 (Prior Art)
FIG. 5 illustrates an example of a graphical representation of a full representation of a stream of data events.

FIG. 5 illustrates an example of a graphical representation 500 of a full representation of a stream of data events 515 where no data events have been eliminated. The graphical representation 500 is defined along two axes, a first axis 505 representing parameter values (e.g., gain level values) of the signal and a second axis 510 representing time-based values associated with the parameter values. The full representation of the stream of data events 515 is comprised of a series of data events 520 and a series of connecting functions 525 that connect data events 520 that are adjacent relative to the second axis 510.

Each data event 520 contains a parameter value of the signal and a time-based value associated with the parameter value. The position of a data event 520 in the graphical representation 500 is based on the parameter and time-based values of the data event. Since the data events are typically generated at a uniform sampling rate, the data events are evenly spaced out along the time-based axis (the second axis 510).

The connecting functions 525 that connect the data events 520 is determined by the type of parameter values contained in the data events 520. For example, if the parameter values relate to an audio signal and the parameter values are panning level values, the connecting function 525 may be a line connecting the data events 520. As another example, if the parameter values relate to an audio signal and the parameter values are gain level values, the connecting function 525 may be a logarithmic curve connecting the data events 520.

For the purposes of discussion, the full representation of the stream of data events 515 is divided into 6 portions along the time-based axis (the second axis 510): a first portion 530, a second portion 535, a third portion 540, a fourth portion 545, a fifth portion 550, and a sixth portion 555. The first portion 530 contains data events that are generally positioned along a straight line. The second portion 535 also contains data events that are generally positioned along a straight line that is significantly different in slope than the straight line that the data events of the first portion 530 are generally positioned along.

The third portion 540 contains data events that are generally positioned along a straight line that is opposite in slope sign than the straight line that the data events of the second portion 535 are generally positioned along. The fourth portion 545 contains data events that are generally positioned along a straight line that is slightly different in slope than the straight line that the data events of the third portion 540 are generally positioned along. The fifth portion 550 contains data events that are generally positioned along a straight line that is significantly different in slope than the straight line that the data events of the fourth portion 545 are generally positioned along. And the sixth portion 555 contains data events that are generally positioned along a straight line that is opposite in slope sign than the straight line that the data events of the fifth portion 550 are generally positioned along.

As shown in FIG. 5, numerous data events 520 are used in the full representation of the stream of data events 515 even where fewer data events would adequately represent the stream of data events within a given threshold of tolerance. For example, in a first portion 530 of the full representation of the stream of data events 515, the data events 520 are positioned along a relatively straight line. Therefore, in the first portion 530, the stream of data events may be adequately represented (within a given threshold of tolerance) by only two data events—the data event at the beginning of the first portion 530 and the data event at the ending of the first portion 530. Each of the other data events in the first portion 530, therefore, can be eliminated without significantly reducing the accuracy of the representation of the stream of data events.

As a further example, the fourth portion 545 contains data events that are generally positioned along a straight line that is slightly different in slope than the straight line that the data events of the third portion 540 are generally positioned along. Therefore, across the third and fourth portions 540 and 545, the stream of data events may be adequately represented (within a given threshold of tolerance) by only two data events—the data event at the beginning of the third portion 540 and the data event at the ending of the fourth portion 545. Each of the other data events in the third and fourth portions 540 and 545, therefore, can be eliminated without significantly reducing the accuracy of the representation of the stream of data events.

Figure 6:
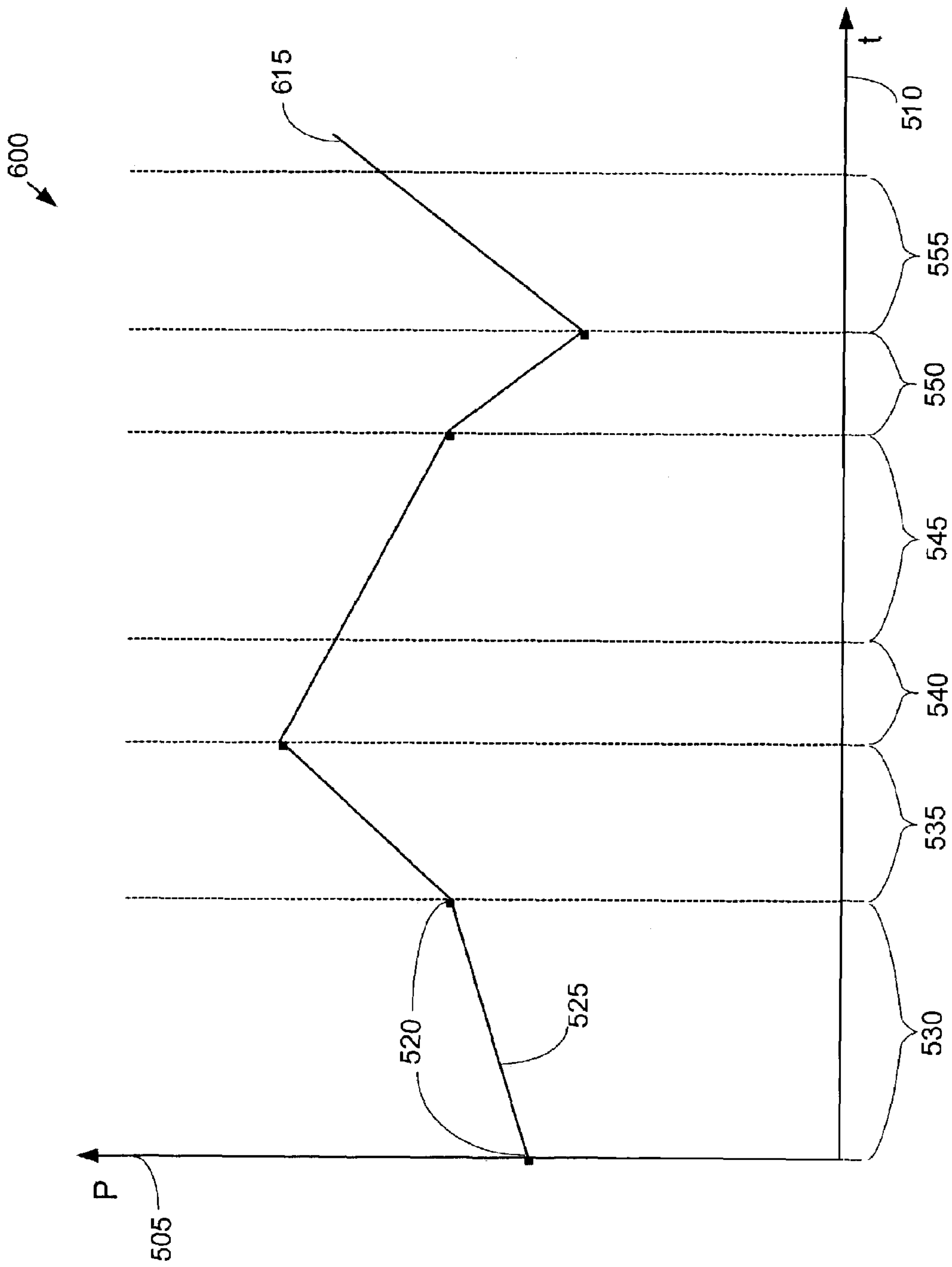
FIG. 6 illustrates an example of a graphical representation of a reduced representation of a stream of data events in accordance with the present invention.

FIG. 6 illustrates an example of a graphical representation 600 of a reduced representation of a stream of data events 615 in accordance with the present invention. The graphical representation 600 of FIG. 6 is similar to the graphical representation 500 of FIG. 5. Only those aspects that differ with the graphical representation 500 of FIG. 5 will be discussed in detail here.

The reduced representation of a stream of data events 615 relates to the same parameter of the same signal as the full representation of the stream of data events 515 of FIG. 5. The reduced representation of a stream of data events 615, however, is comprised of fewer data events than the full representation of the stream of data events 515. Data events of the full representation of the stream of data events 515 are reduced or eliminated in accordance with processes of the present invention (as described below in relation to FIGS. 13 and 14)

For the purposes of discussion, the reduced representation of a stream of data events 615 is divided into the same portions along the time-based axis (the second axis 510) as the full representation of the stream of data events 515. As shown in FIG. 6, a first portion 530 of the reduced representation of a stream of data events 615 contains only two data events 520 connected by a single connecting function 520. The rest of the data events of the first portion 530 of the full representation of a stream of data events 515 have been eliminated without significantly reducing the accuracy of the representation of the stream of data events.

Note that the data event at the ending of the first portion 530 has been retained since the first portion 530 contains data events that are generally positioned along a straight line that is significantly different in slope than the straight line that the data events of the second portion 535 are generally positioned along. Therefore, this data event is needed to accurately represent the stream of data events. Also note that the data event at the ending of the second portion 535 has been retained since the second portion 535 contains data events that are generally positioned along a straight line that is opposite in slope sign than the straight line that the data events of the third portion 540 are generally positioned along. Therefore, this data event is also needed to accurately represent the stream of data events.

A third portion 540 and a fourth portion 545 of the reduced representation of a stream of data events 615 contains only two data events 520 connected by a single connecting function 520. The straight lines with slightly different slopes of the third portion 540 and the fourth portion 545 shown in FIG. 5 have been reduced to a single line connecting the beginning data event of the third portion 540 and the ending data event of the fourth portion 545 in FIG. 6. Each of the other data events in the third and fourth portions 540 and 545 of the full representation of a stream of data events 515 have been eliminated without significantly reducing the accuracy of the representation of the stream of data events.

Note that the data event at the ending of the fourth portion 545 has been retained since the fourth portion 545 contains data events that are generally positioned along a straight line that is significantly different in slope than the straight line that the data events of the fifth portion 550 are generally positioned along. Therefore, this data event is needed to accurately represent (within a given threshold of tolerance) the stream of data events. Also note that the data event at the ending of the fifth portion 550 has been retained since the fifth portion 550 contains data events that are generally positioned along a straight line that is opposite in slope sign than the straight line that the data events of the sixth portion 555 are generally positioned along. Therefore, this data event is also needed to accurately represent the stream of data events.

In an alternative embodiment, the connecting functions 525 connecting the data events 520 is not a line but any other mathematically defined function, such as a logarithmic curve.

In this description, a line is used as the connecting function only for the sake of simplicity.

Figure 7:
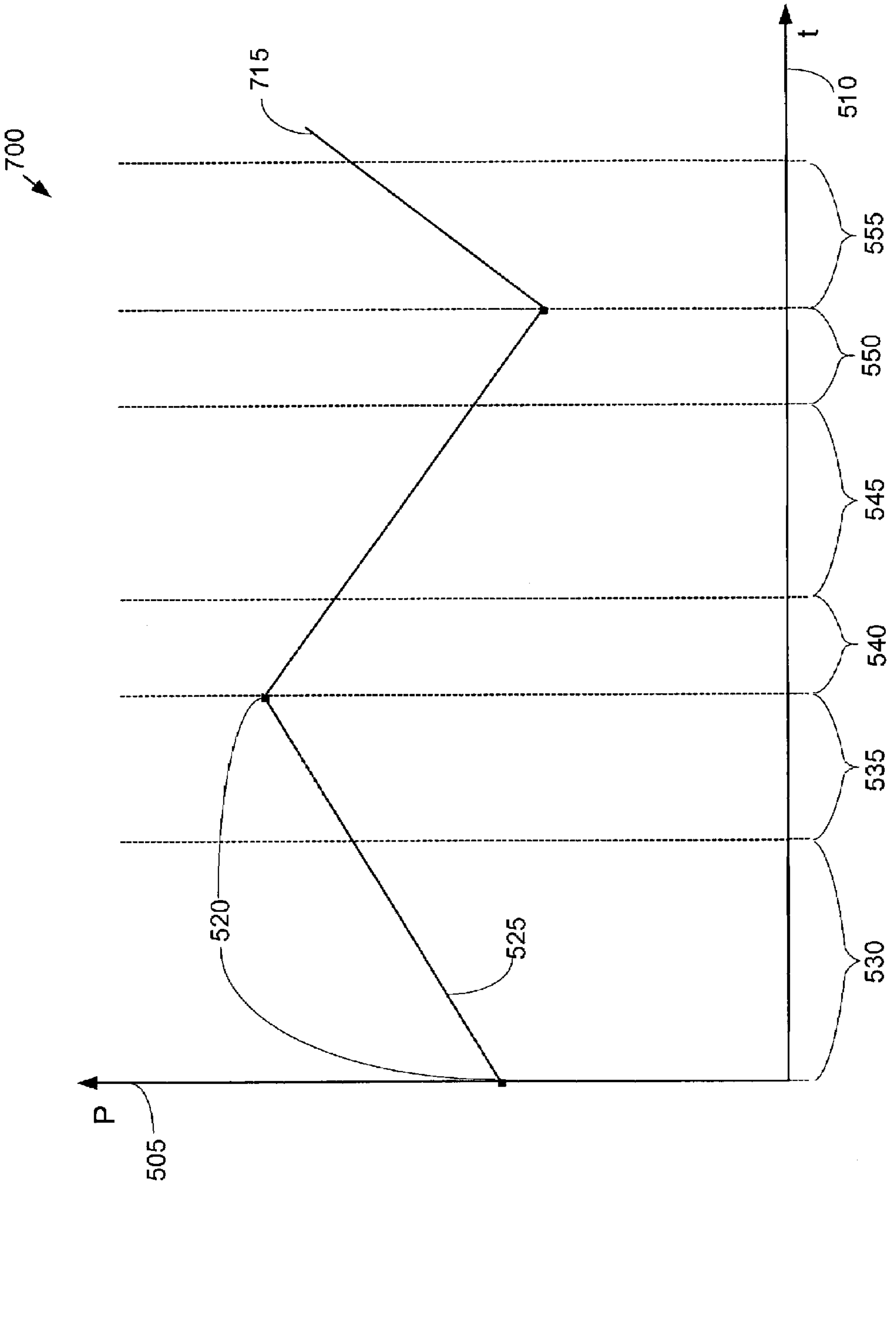
FIG. 7 illustrates an example of a graphical representation of a peaks-only representation of a stream of data events in accordance with the present invention.

FIG. 7 illustrates an example of a graphical representation 700 of a peaks-only representation of a stream of data events 715 in accordance with the present invention. The graphical representation 700 of FIG. 7 is similar to the graphical representation 500 of FIG. 5. Only those aspects that differ with the graphical representation 500 of FIG. 5 will be discussed in detail here.

The peaks-only representation of a stream of data events 715 represents the same parameter of the same signal as the full representation of the stream of data events 515 of FIG. 5. The peaks-only representation of a stream of data events 715, however, is comprised of fewer data events than the full representation of the stream of data events 515. Data events of the full representation of the stream of data events 515 are reduced or eliminated in accordance with a process of the present invention (as described below in relation to FIG. 15).

Note that only the data events 520 at "peaks" (i.e., local maxima) and "valleys" (i.e., local minima) of the full representation of a stream of data events 515 have been retained in the peaks-only representation of a stream of data events 715 and all other data events have been eliminated. A data event is at a peak "peak" or "valley" of the full representation of a stream of data events 515 when data events on one side of the data event are generally positioned along a line that is opposite in slope sign than a line that the data events on the other side of the data event are generally positioned along. As such, the data event 520 at the ending of the second portion 535 and the data event 520 at the ending of the fifth portion 550 are retained.

Figure 8:
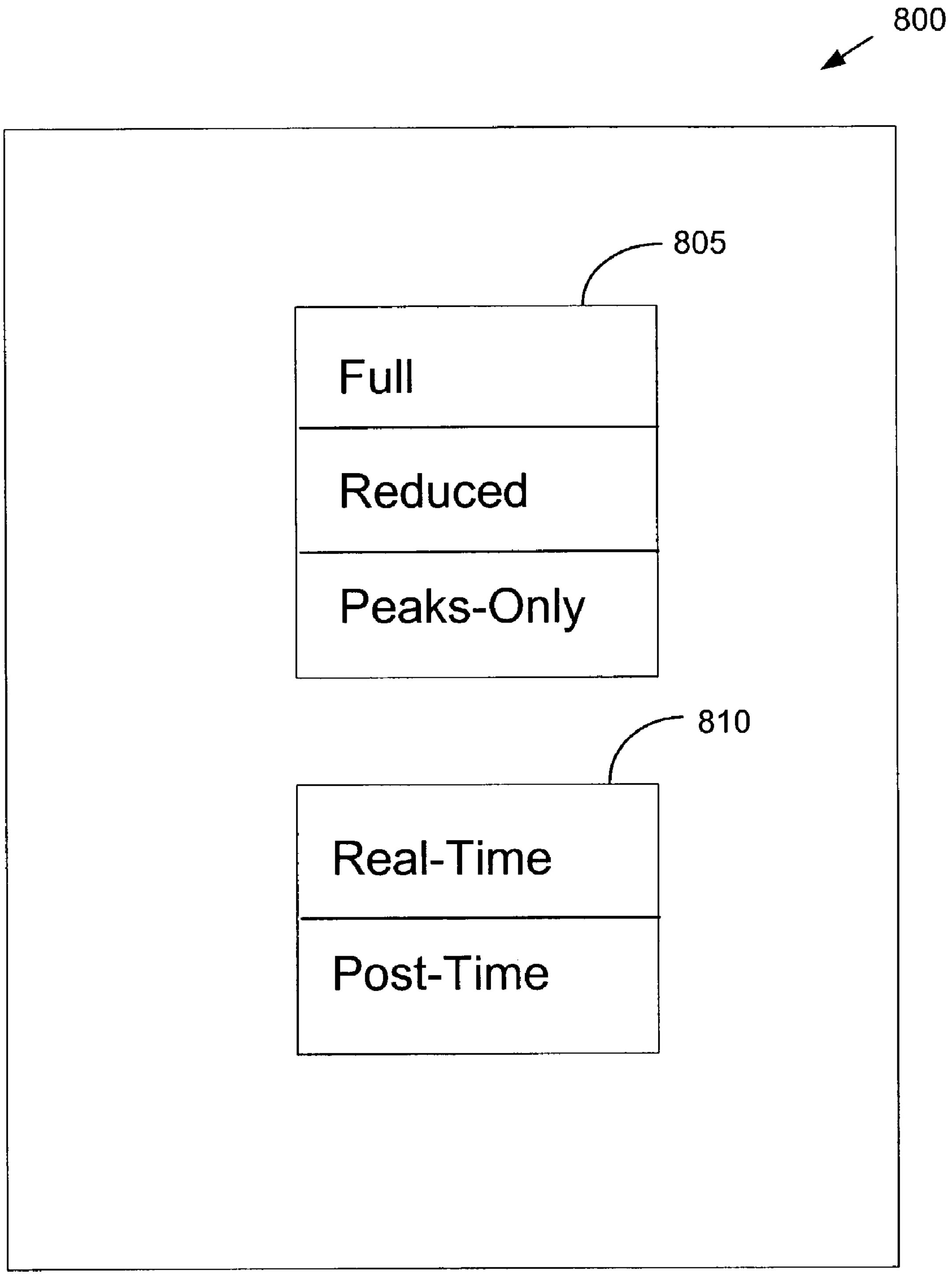
FIG. 8 illustrates an example of a mode selection interface.

FIG. 8 illustrates a mode selection interface 800 used to select a full, reduced, or peaks-only representation of a stream of data events and a real-time or post-time processing of the stream of data events. In some embodiments, the mode selection interface 800 is part of a graphical user interface ("GUI") with which a user can interact through traditional GUI operations, such as click operations (e.g., to select an item), click-and-drag operations (e.g., to move an item), etc. Different modes of the mode selection interface 800 can be selected by the user through the GUI. The mode selection interface 800 can be used as part of a multimedia application. The mode selection interface 800 includes a representation selector box 805 and a processing selector box 810. The representation selector box 805 contains options for full, reduced, or peaks-only representation of a stream of data events. The processes needed to implement the different options can be performed, for example, by a multimedia application. The processes for full representation of a stream of data events comprises capture of data events at a given sampling rate. These processes are well known in the art and are not described in detail here. The processes for reduced representation of a stream of data events comprises processes that reduce the number of data events used to represent a stream of data events (as discussed below in relation to FIGS. 13 and 14). The process for peaks-only representation of a stream of data events comprises a process that retains only those data events that represent the "peaks" and "valleys" of a stream of data events (as discussed below in relation to FIG. 15).

The processing selector box 810 contains options for real-time or post-time processing of data events of a stream of data events. The processes needed to implement these different options can be performed, for example, by a multimedia application. The option for real-time processing allows for processing of data events immediately after generation of the data events, typically before the data events have been saved to storage. In contrast, the option for post-time processing allows for processing of data events that have already been captured and saved to storage.

Figure 9:
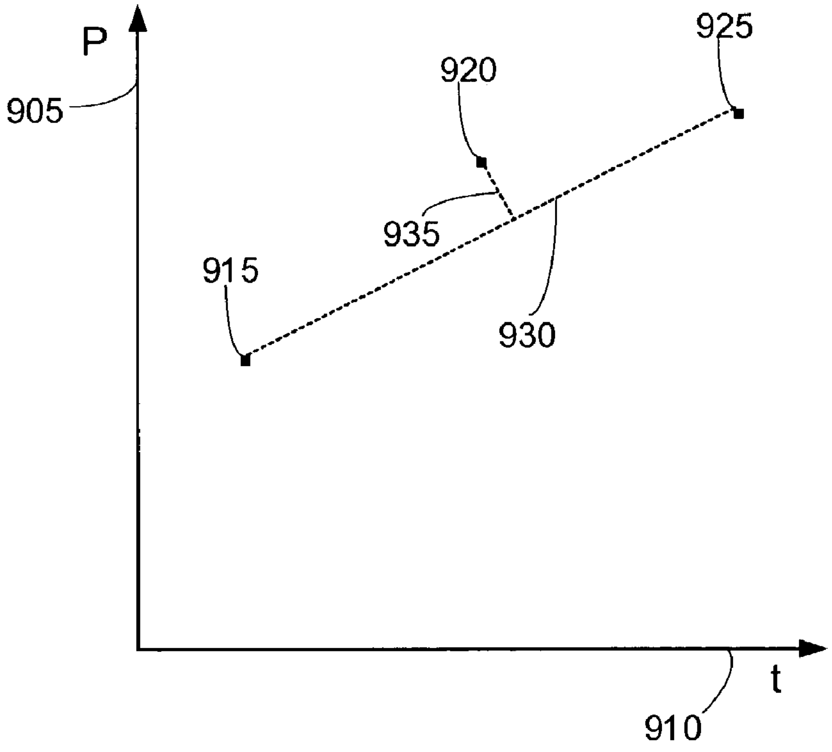
FIG. 9 shows a graphical illustration of an operation of a first algorithm used to reduce data events of a stream of data events.

FIG. 9 shows a graphical illustration of an operation of a first algorithm used to reduce data events of a stream of data events. The graphical illustration is shown along two axes, a first axis 905 representing the parameter values (e.g., gain level values) of a signal and a second axis 910 representing the time-based values associated with the parameter values. A beginning data event 915, a middle data event 920, and an ending data event 925 each contain a parameter value of the signal and a time-based value associated with the parameter value. The data events 915, 920, and 925 are defined by a time-based value of each data event relative to each the other: the beginning data event 915 has a time-based value lower than the time-based value of the middle data event 920 and the middle data event 920 has a time-based value lower than the time-based value of the ending data event 925. The time-based values of the three data events may or may not be evenly spaced.

A mathematically defined connecting function 930 connects the beginning data event 915 and the ending data event 925. The mathematically defined connecting function 930 is determined by the type of parameter values contained in the data events 915, 920, and 925. For example, if the data events 915, 920, and 925 contain panning level values for an audio signal, the mathematically defined connecting function 930 may be a line connecting the beginning data event 915 and the ending data event 925. As another example, if the data events 915, 920, and 925 contain gain level values for an audio signal, the mathematically defined connecting function 930 may be a logarithmic curve connecting the beginning data event 915 and the ending data event 925. The mathematically defined connecting function 930 is defined in terms of parameter values and time-based values.

A difference function 935 connects the middle data event 920 with the mathematically defined connecting function 930. The difference function 935 has a length that is equivalent to a difference or distance between the middle data event 920 and the mathematically defined connecting function 930. The difference function 935 and the difference between the middle data event 920 and the mathematically defined connecting function 930 are in terms of parameter values and time-based values. If the difference between the middle data event 920 and the mathematically defined connecting function 930 is within a predetermined threshold difference, the middle data event 920 is eliminated, otherwise the middle data event 920 is retained (as described below in relation to FIG. 13).

Figure 10:
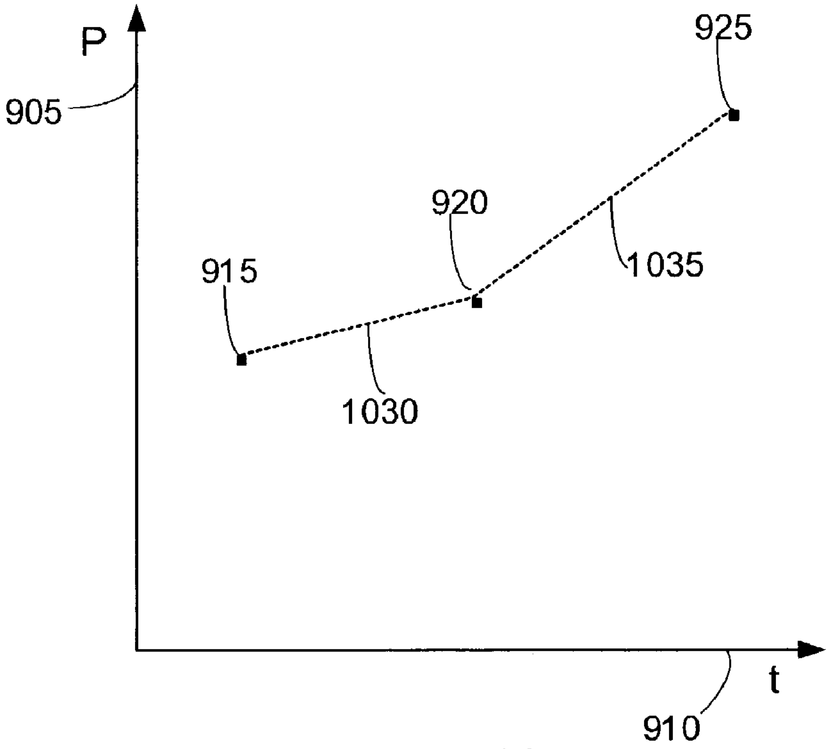
FIG. 10 shows a graphical illustration of an operation of a second algorithm used to reduce data events of a stream of data events.

FIG. 10 shows a graphical illustration of an operation of a second algorithm used to reduce data events of a stream of data events. The graphical illustration of FIG. 10 is similar to the graphical illustration of FIG. 9. Only those aspects that differ from FIG. 9 will be described in detail here.

As shown in FIG. 10, a first line 1030 having a first slope value connects the beginning data event 915 and the middle data event 920 and a second line 1035 having a second slope value connects the middle data event 920 and the ending data event 925. The first line 1030 and the second line 1035 as well as the first and second slope values are in terms of parameter values and time-based values. In accordance with the present invention, a difference between the first slope value and the second slope value is determined. If the difference between the slopes is within a predetermined threshold difference, the middle data event 920 is eliminated, otherwise the middle data event 920 is retained (as described below in relation to FIG. 14).

Figure 11:
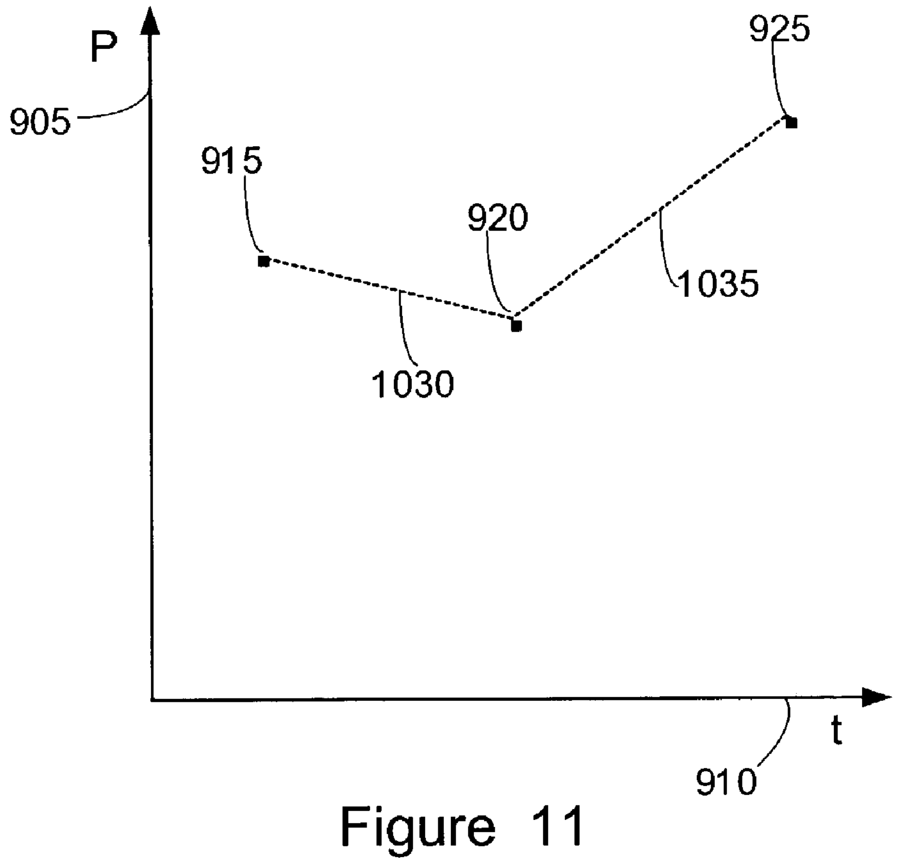
FIG. 11 shows a graphical illustration of an operation of a third algorithm used to reduce data events of a stream of data events.

FIG. 11 shows a graphical illustration of an operation of a third algorithm used to reduce data events of a stream of data events. The graphical illustration of FIG. 11 is similar to the graphical illustration of FIG. 10. Only those aspects that differ from FIG. 10 will be described in detail here.

As shown in FIG. 11, a first line 1030 having a first slope value connects the beginning data event 915 and the middle data event 920 and a second line 1035 having a second slope value connects the middle data event 920 and the ending data event 925. In accordance with the present invention, a sign of the first and second slope values are determined. If the first and second slope values are of the same sign, the middle data event 920 is eliminated, otherwise the middle data event 920 is retained (as described below in relation to FIG. 15).

Figure 12:
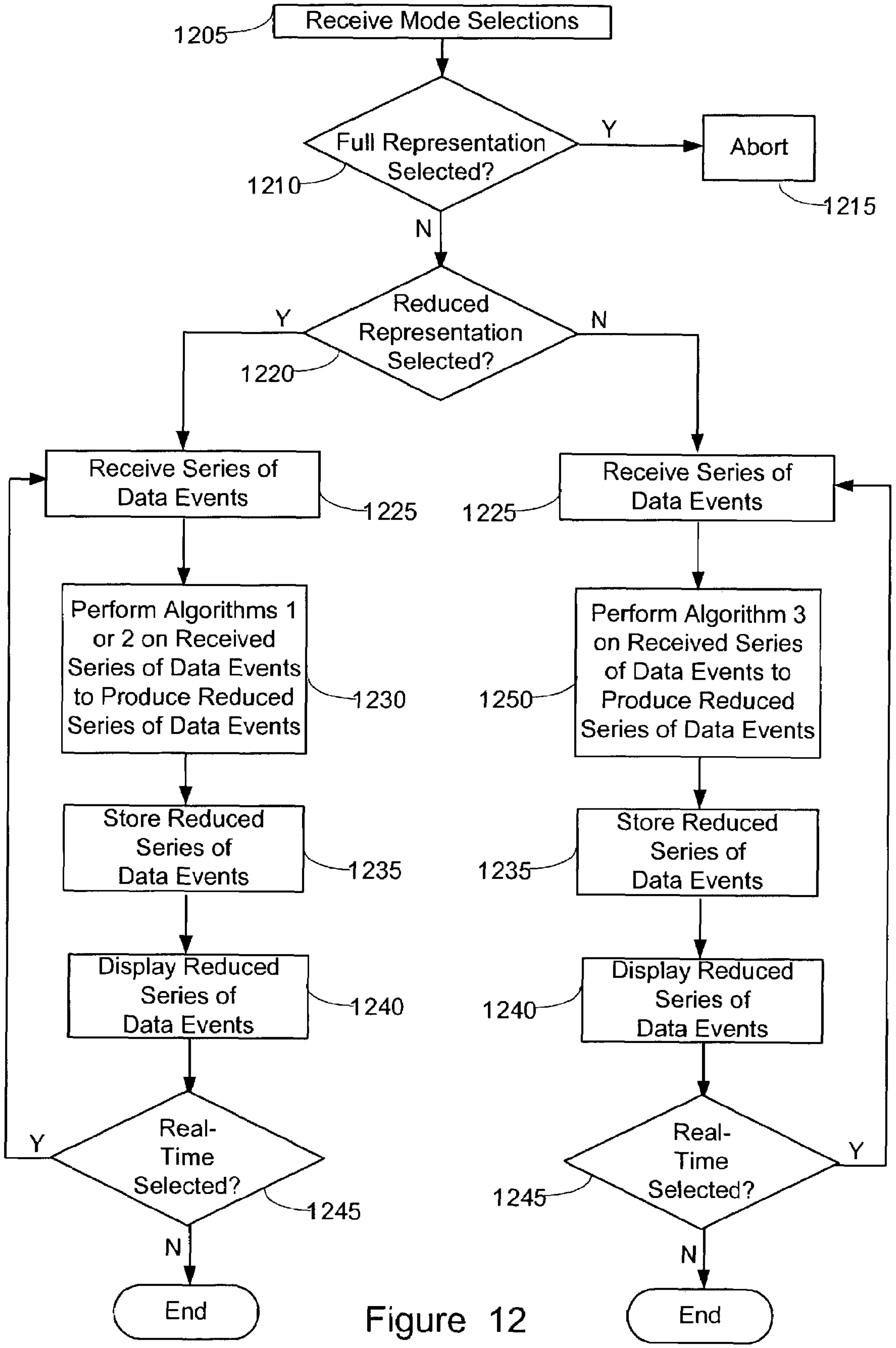
FIG. 12 illustrates a general process for reducing data events of a stream of data events.

FIG. 12 illustrates a general process for reducing data events of a stream of data events. This process may be executed, for example, by a multimedia application. The process starts when a user makes mode selections (for example through the mode selection interface 400 of FIG. 8) and mode selections are received (at 1205) by the process. The process determines (at 1210) if a full representation selection has been received. The processes for full representation of a stream of data events comprises capture of data events at a given sampling rate. These processes are typically undertaken by a conventional multimedia application and do not require further procedures. Therefore, if a full representation selection has been received (at 1210—Yes), the process aborts at 1215.

Otherwise, the process continues and determines (at 1220) if a reduced representation selection has been received. If so, the process receives (at 1225) a series of data events. The series of data events are received from a multimedia application for real-time processing and typically from storage in post-time processing (see below in relation to step 1245). The series of data events is comprised of 3 or more data events that are ordered according to time-based values contained in the data events. In real-time processing, the series of data events is comprised of a relatively small number of data events since real-time processing requires processing of data events immediately after generation. In post-time processing, the series of data events is comprised of a relatively large number of data events since post-time processing occurs after all data events have been captured and stored by a multimedia application (see below in relation to step 1245).

The process then performs (at 1230) a first algorithm or a second algorithm on the received series of data events. The first and/or second algorithms eliminate one or more data events from the received series of data events to produce a reduced series of data events. The process stores (at 1235) the reduced series of data events, for example, in a disk or random access memory. The process then displays (at 1240) a graphical representation of the reduced series of data events in (as shown, for example, in FIG. 6). As such, the process excludes from the graphical representation the data events that have been eliminated from the received series of data events.

The process then determines (at 1245) if a real-time selection has been received (at 1205). As stated above, real-time processing of data events allows for processing of data events immediately after generation of the data events by a multimedia application. Therefore, if the process determines (at 1245—Yes) that a real-time selection has been received, another series of data events will be received (at 1225) from the multimedia application for processing.

If the process determines (at 1245—No) that a real-time selection has not been received, then the process assumes that a post-time selection has been received (at 1205). The option for post-time processing of data events allows for processing of data events that have already been captured and stored. Therefore, the received series of data events comprise all the data events that need to be processed. Therefore, if the process determines (at 1245—No) that a post-time selection has been received, the process ends.

If the process determines (at 1220—No) that a reduced representation selection has not been received, the process assumes that a peaks-only representation selection has been received (at 1205). The process for a peaks-only representation selection is similar to the process for a reduced representation selection (described above) except that the process performs (at 1250) a third algorithm on the received series of data events.

Figure 13:
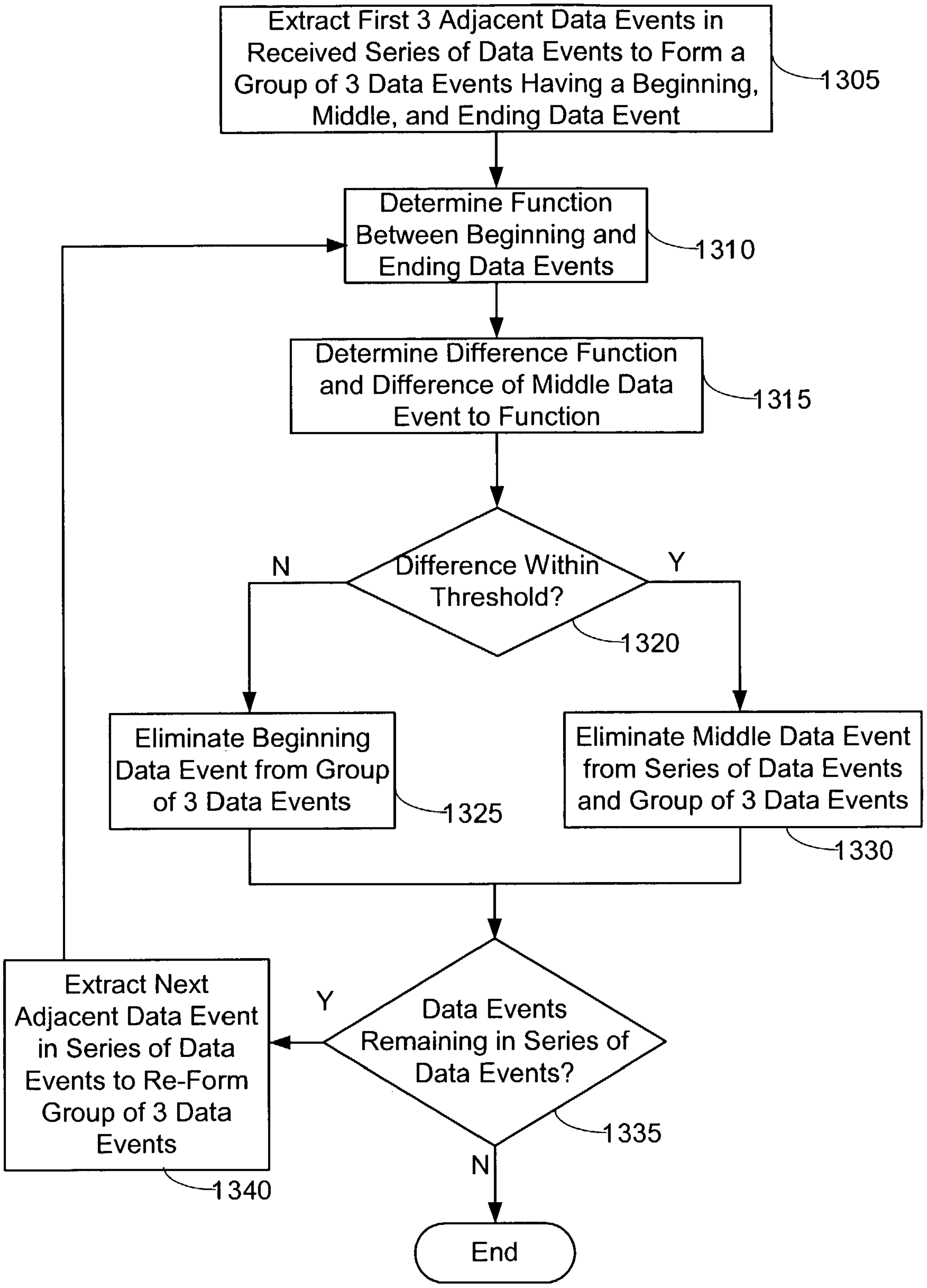
FIG. 13 illustrates a process for reducing data events of a stream of data events using a first algorithm.

FIG. 13 illustrates a process for reducing data events of a stream of data events using a first algorithm. The process starts when a series of data events is received and the process extracts (at 1305) the first 3 adjacent data events in the series of data events. The first 3 adjacent data events are the 3 data events with the lowest time-based values in the series of data events. In an alternative embodiment, any other set of 3 adjacent data events in the series of data events is extracted (at 1305). As used herein, adjacent data events refers to data events that have time-based values adjacent to each other relative to the time-based values of the other data events in the series of data events.

The 3 adjacent data events are used to form a group of 3 data events, the 3 data events being comprised of a beginning data event 915, a middle data event 920, and an ending data event 925. The beginning data event 915 has a time-based value lower than the time-based value of the middle data event 920 and the middle data event 920 has a time-based value lower than the time-based value of the ending data event 925.

The process then determines (at 1310) a mathematically defined connecting function 930 that connects the beginning data event 915 and the ending data event 925. As stated above, the mathematically defined connecting function 930 is determined by the type of parameter values contained in the data events 915, 920, and 925. The process then determines (at 1315) a difference function 935 that connects the middle data event 920 with the mathematically defined connecting function 930 and the length of the difference function 935, the length of the difference function 935 being equivalent to a difference or distance between the middle data event 920 and the mathematically defined connecting function 930. The difference function 935 and the difference between the middle data event 920 and the mathematically defined connecting function 930 are in terms of parameter values and time-based values.

The process determines (at 1320) if the difference between the middle data event 920 and the mathematically defined connecting function 930 is within a predetermined threshold difference. The predetermined threshold difference reflects the amount of variance that must be present between the middle data event 920 and the mathematically defined connecting function 930 for the middle data event 920 to be considered necessary to adequately represent the stream of data events and therefore retained. If the middle data event 920 is relatively close to the mathematically defined connecting function 930, the middle data event 920 may be considered unnecessary to adequately represent the stream of data events and therefore eliminated. The predetermined threshold difference may be altered depending on how accurate a representation of a stream of data events is desired.

If the process determines (at 1320—Yes) that the difference between the middle data event 920 and the mathematically defined connecting function 930 is within a predetermined threshold difference, the middle data event 920 is eliminated (at 1330) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1320—No) that the difference between the middle data event 920 and the mathematically defined connecting function 930 is not within a predetermined threshold difference, the beginning data event 915 is eliminated (at 1325) from the group of 3 data events. Note that the middle data event 920 is not eliminated from the series of data events.

The process then determines (at 1335) if there are data events remaining in the series of data events to be processed. If so, the process extracts (at 1340) a next data event in the series of data events that is adjacent to the ending data event 925. In an alternative embodiment, the process extracts (at 1340) a next data event in the series of data events that is adjacent to the beginning data event 915.

The next data event and the remaining two data events in the group of 3 data events (either the beginning data event 915 or the middle data event 920 have been eliminated from the group of 3 data events) are used to re-form the group of 3 data events. As before, the data events are named according to the time-based values of the data events so that the beginning data event 915 has a time-based value lower than the time-based value of the middle data event 920 and the middle data event 920 has a time-based value lower than the time-based value of the ending data event 925. The process then continues at 1310.

If the process determines (at 1335—No) that there are no data events remaining in the series of data events, the process ends.

Figure 14:
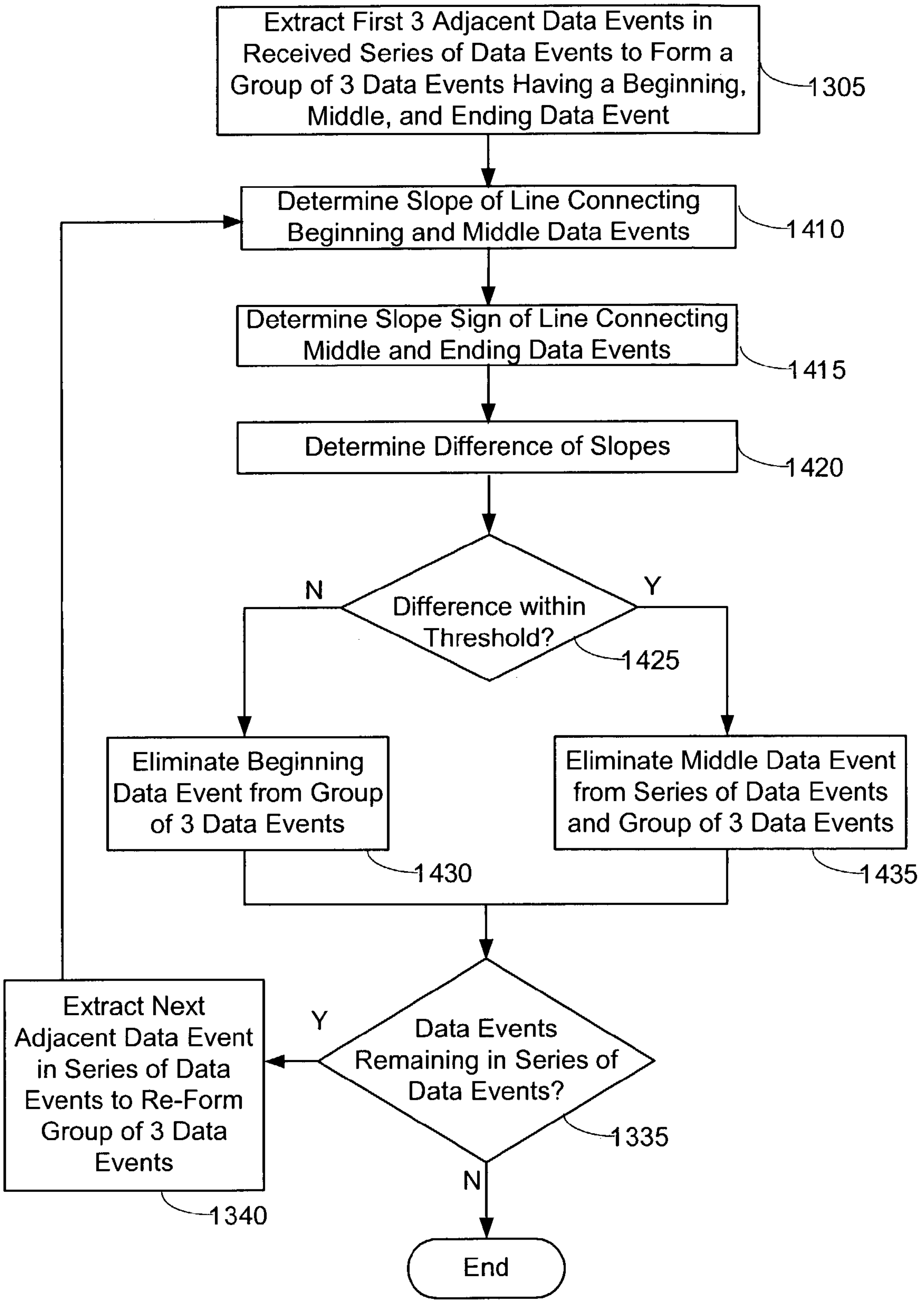
FIG. 14 illustrates a process for reducing data events of a stream of data events using a second algorithm.

FIG. 14 illustrates a process for reducing data events of a stream of data events using a second algorithm. FIG. 14 has aspects that are similar to those described above in relation to FIG. 13 that are not described here.

The process determines (at 1410) a first slope value of a first line 1030 that connects the beginning data event 915 and the middle data event 920 and determines (at 1415) a second slope value of a second line 1035 that connects the middle data event 920 and the ending data event 925. The first line 1030 and the second line 1035 as well as the first and second slope values are in terms of parameter values and time-based values. The process then determines (at 1420) a difference between the first and second slope values.

The process determines (at 1425) if the difference between the first and second slope values is within a predetermined threshold difference. The predetermined threshold difference reflects the amount of variance that must be present between the first and second slope values for the middle data event 920 to be considered necessary to adequately represent a stream of data events. If the first and second slope values are relatively close in value, the middle data event 920 may be considered unnecessary to adequately represent a stream of data events and therefore eliminated. The predetermined threshold difference may be altered depending on how accurate a representation of a stream of data events is desired.

If the process determines (at 1425—Yes) that the difference between the first and second slope values is within the predetermined threshold difference, the middle data event 920 is eliminated (at 1435) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1425—No) that the difference between the first and second slope values is not within the predetermined threshold difference, the beginning data event 915 is eliminated (at 1430) from the group of 3 data events. Note that the middle data event 920 is not eliminated from the series of data events.

Figure 15:
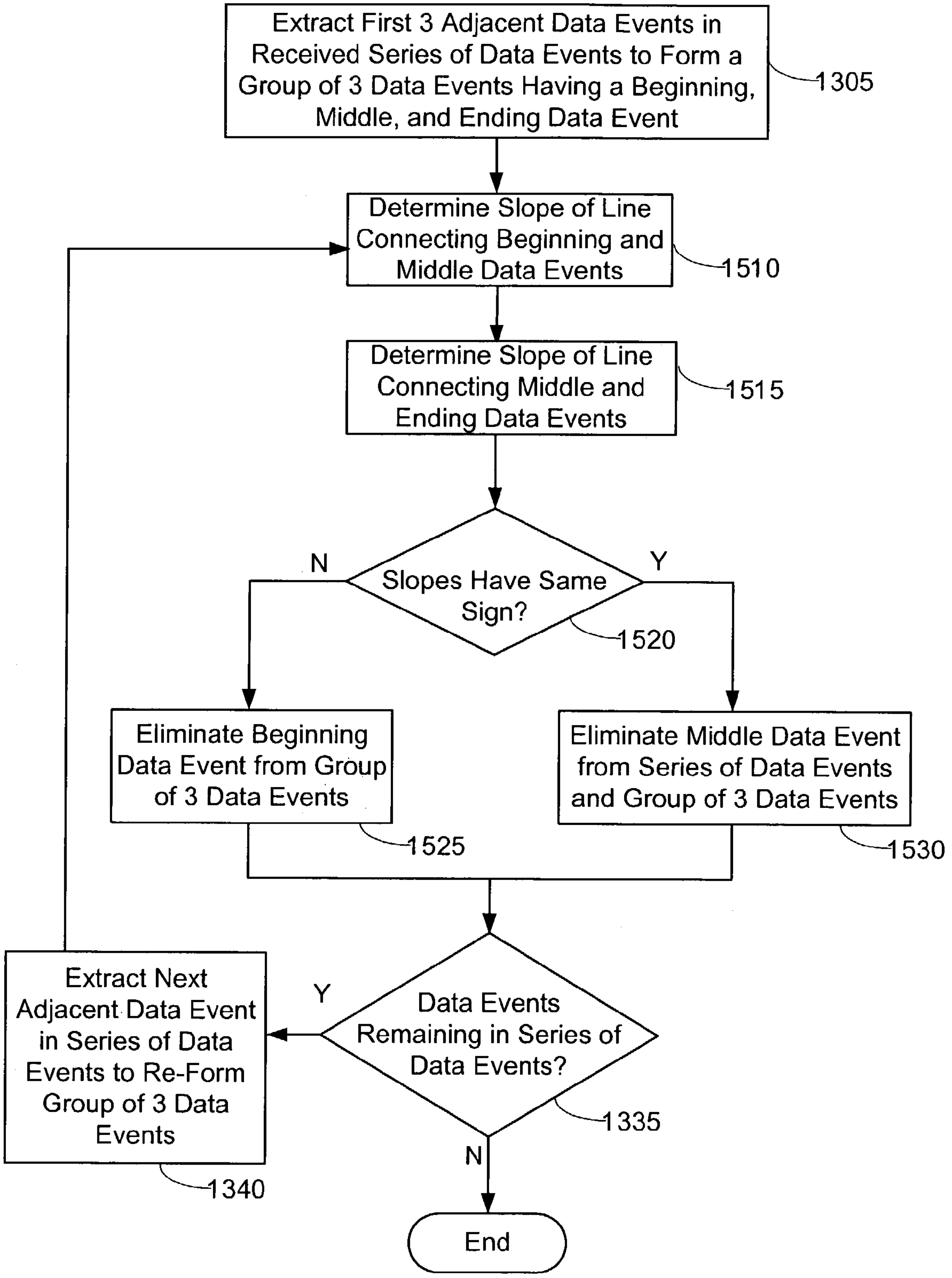
FIG. 15 illustrates a process for reducing data events of a stream of data events using a third algorithm.

FIG. 15 illustrates a process for reducing data events of a stream of data events using a third algorithm. FIG. 15 has aspects that are similar to those described above in relation to FIG. 13 that are not described here.

The process determines (at 1910) a first slope value of a first line 1030 that connects the beginning data event 915 and the middle data event 920 and determines (at 1915) a second slope value of a second line 1035 that connects the middle data event 920 and the ending data event 925. The process then determines (at 1920) if the first slope value has a same sign as the second slope value.

If the process determines (at 1920—Yes) that the first slope value has a same sign as the second slope value, the middle data event 920 is eliminated (at 1930) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1920—No) that the first slope value does not have a same sign as the second slope value, the beginning data event 915 is eliminated (at 1925) from the group of 3 data events. Note that the middle data event 920 is not eliminated from the series of data events. By retaining the middle data event 920 only when the first slope value has a different sign as the second slope value, only data events that represent the "peaks" (i.e., local maxima) and "valleys" (i.e., local minima) of the stream of data events are retained.

Figure 16:
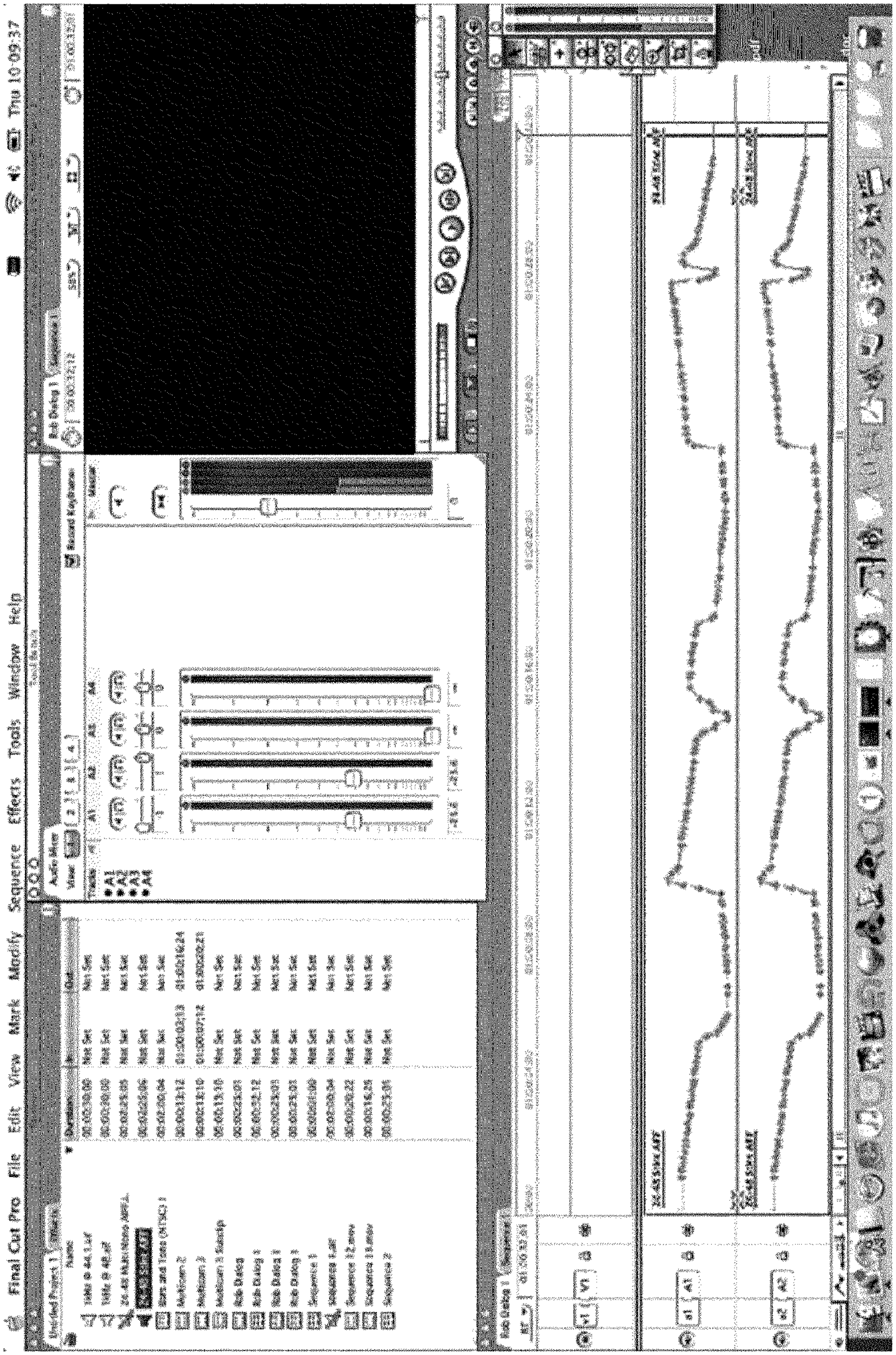
FIG. 16 shows a screen shot of an example of a full representation of a stream of data events.
Figure 17:
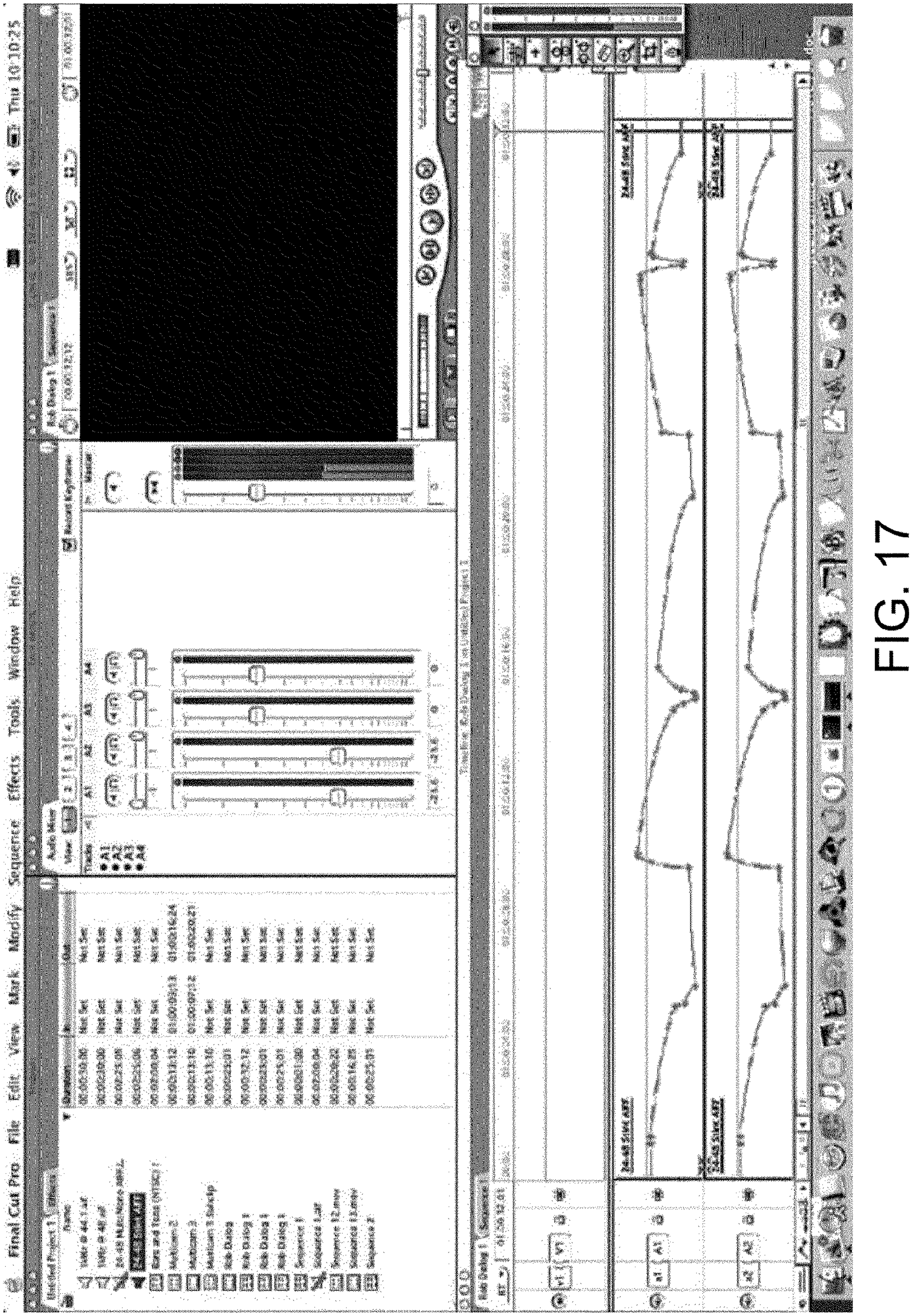
FIG. 17 shows a screen shot of an example of a reduced representation of a stream of data events in accordance with the present invention.
Figure 18:
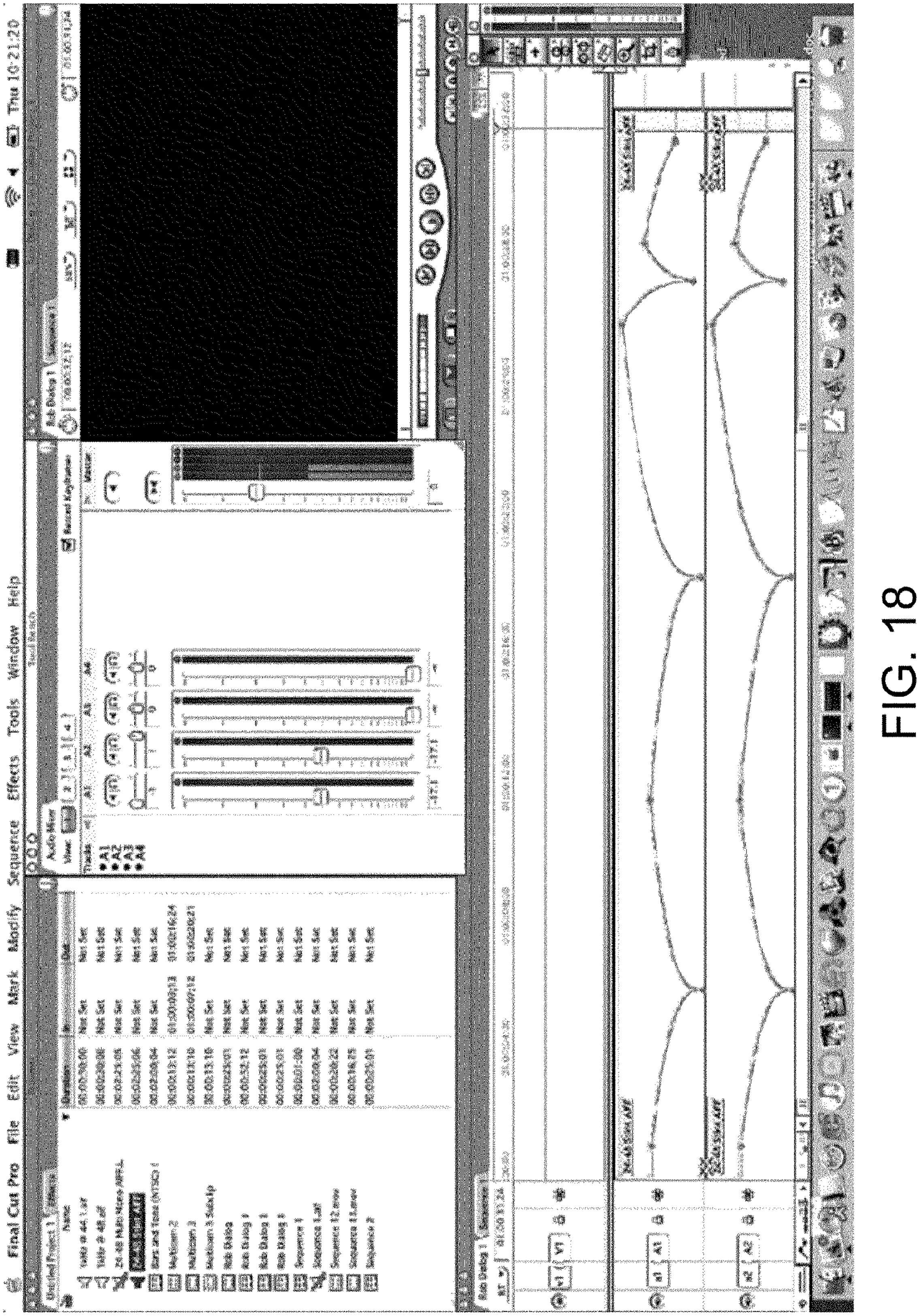
FIG. 18 shows a screen shot of an example of a peaks-only representation of a stream of data events in accordance with the present invention.
Figure 19:
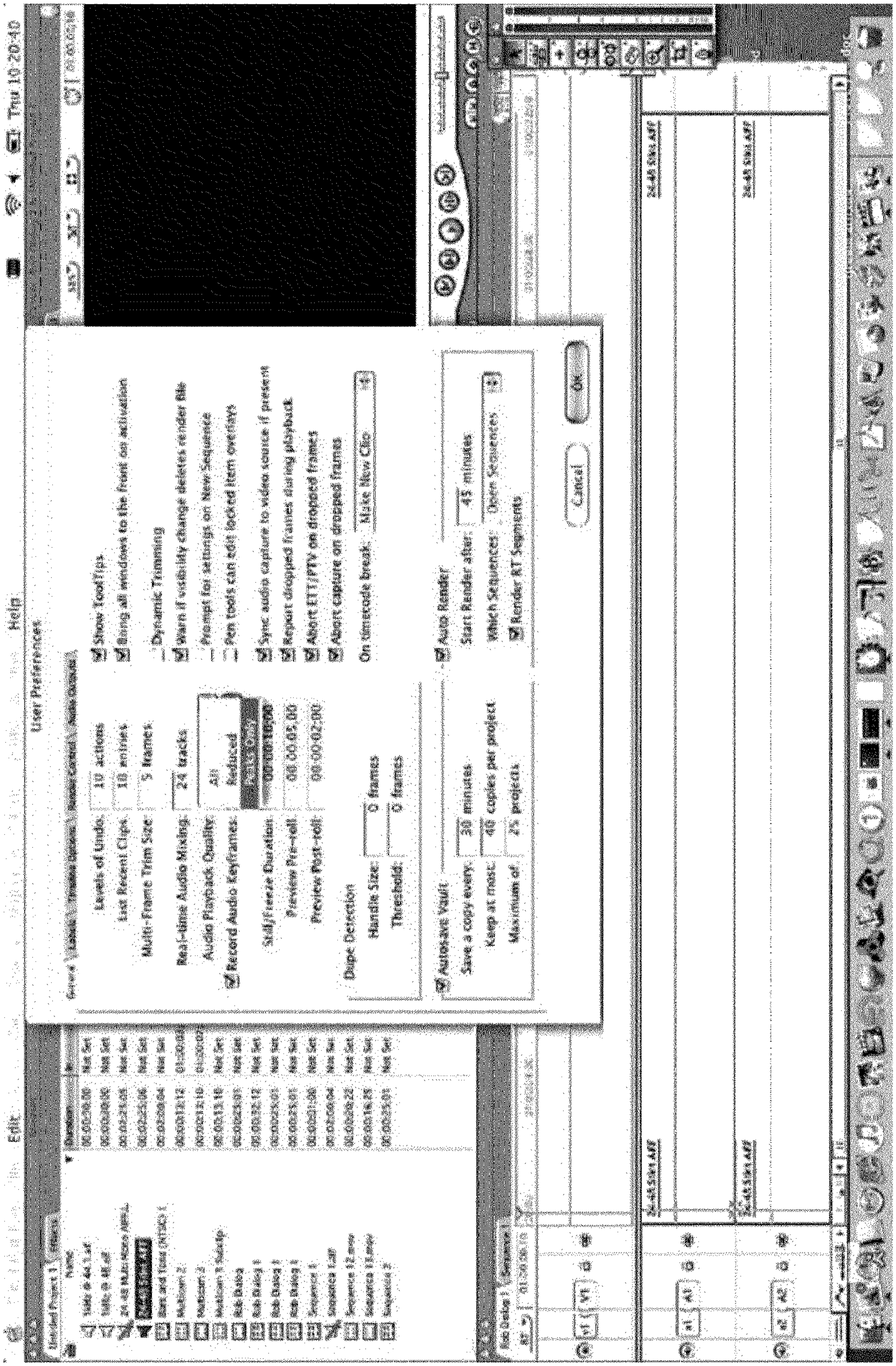
FIG. 19 shows a screen shot of an example a mode selection interface.

FIGS. 16 through 19 show examples of actual screen shots that are produced in relation to the present invention. FIG. 16 shows a screen shot of an example of a full representation of a stream of data events (described above in relation to FIG. 5). FIG. 17 shows a screen shot of an example of a reduced representation of a stream of data events (described above in relation to FIG. 6). FIG. 18 shows a screen shot of an example of a peaks-only representation of a stream of data events (described above in relation to FIG. 7). FIG. 19 shows a screen shot of an example a mode selection interface (described above in relation to FIG. 8).

As stated above, some embodiments of the invention provide a method for reducing data events representing a parameter of a signal adjusted by a user through a control interface during a time period. The embodiments described above often relate to a gain level parameter of an audio signal. One of ordinary skill in the art, however, will realize that the invention can relate to any variety of parameters relating to different types of signals. For example, the invention may relate to a panning level parameter of an audio signal. As another example, the invention may relate to a contrast or brightness level parameter of a video signal. In effect, the invention may relate to any time-based parameter of a signal.

Figure 20:
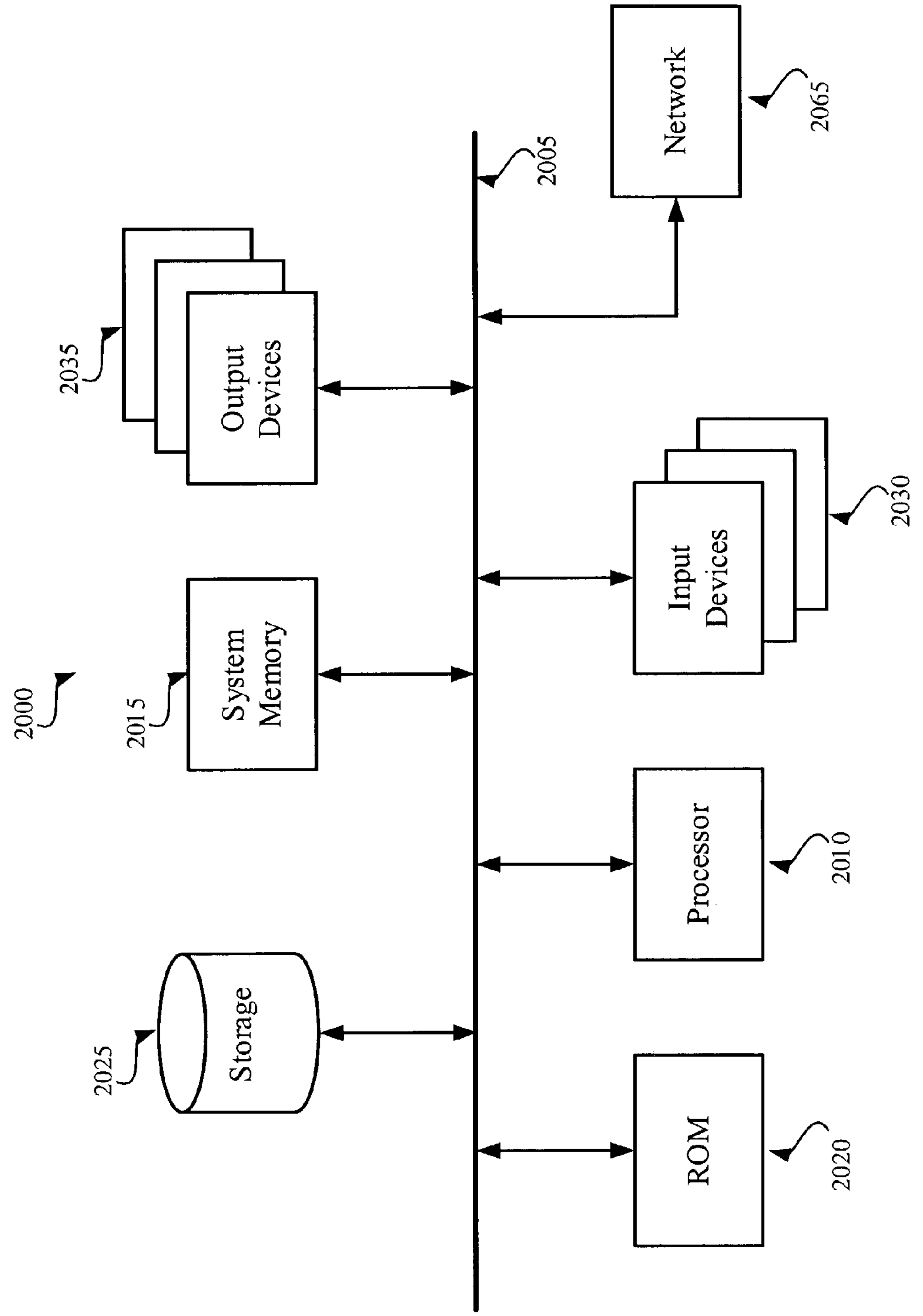
FIG. 20 presents a computer system with which some embodiments of the invention is implemented.

FIG. 20 presents a computer system with which some embodiments of the invention is implemented. Computer system 2000 includes a bus 2005, a processor 2010, a system memory 2015, a read-only memory 2020, a permanent storage device 2025, input devices 2030, and output devices 2035.

The bus 2005 collectively represents all system, peripheral, and chipset buses that communicatively connect the numerous internal devices of the computer system 2000. For instance, the bus 2005 communicatively connects the processor 2010 with the read-only memory 2020, the system memory 2015, and the permanent storage device 2025.

From these various memory units, the processor 2010 retrieves instructions to execute and data to process in order to execute the processes of the invention. The read-only-memory (ROM) 2020 stores static data and instructions that are needed by the processor 2010 and other modules of the computer system.

The permanent storage device 2025, on the other hand, is read-and-write memory device. This device is a non-volatile memory unit that stores instruction and data even when the computer system 2000 is off. Some embodiments of the invention use a mass-storage device (such as a magnetic or optical disk and its corresponding disk drive) as the permanent storage device 2025.

Other embodiments use a removable storage device (such as a floppy disk or Zip® disk, and its corresponding disk drive) as the permanent storage device. Like the permanent storage device 2025, the system memory 2015 is a read-and-write memory device. However, unlike storage device 2025, the system memory is a volatile read-and-write memory, such as a random access memory. The system memory stores some of the instructions and data that the processor needs at runtime. In some embodiments, the invention's processes are stored in the system memory 2015, the permanent storage device 2025, and/or the read-only memory 2020.

The bus 2005 also connects to the input and output devices 2030 and 2035. The input devices enable the user to communicate information and select commands to the computer system. The input devices 2030 include alphanumeric keyboards and cursor-controllers. The output devices 2035 display images generated by the computer system. For instance, these devices display IC design layouts. The output devices include printers and display devices, such as cathode ray tubes (CRT) or liquid crystal displays (LCD).

Finally, as shown in FIG. 20, bus 2005 also couples computer 2000 to a network 2065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 2000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a media editing application stored on a computer readable medium of a computer system comprising a processor for executing operations of the media editing application, a method comprising:

receiving a plurality of data events representing a parameter of a signal during a time period, each data event of the plurality of data events comprising a parameter value of the signal and a time-based value for the parameter value that corresponds to an instance in time during the time period;

receiving a user selected display preference specifying a reduced display representation that comprises a smaller set of the plurality of data events;

iteratively processing sets of three data events in the plurality of data events to identify the smaller set of data events by eliminating one of the three data events for at least one set by comparing a parameter value of one of the three data events to parameter values of the other two data events; and displaying the reduced display representation on a display interface of the computer system, the reduced display representation comprising the smaller set of the plurality of data events that excludes eliminated data events.

2. The method of claim 1 wherein the plurality of data events represent the parameter of the signal as adjusted by a user through a control interface during the time period.

3. The method of claim 1 wherein the sets of three data events in the plurality of data events have time-based values adjacent to each other relative to the time-based values of all other data events in the plurality of data events.

4. The method of claim 1, wherein iteratively processing comprises, after eliminating a data event in a set of three data events, processing the remaining two data events of the three data events that have not been eliminated and a next data event in the plurality of data events having a time-based value adjacent, relative to the time-based values of the data events in the plurality of data events that have not been eliminated, to the time-based value of one of the remaining two data events.

5. The method of claim 1 wherein displaying the reduced display representation comprises displaying a graph for the reduced display representation, the graph being defined along two axes, a first axis representing parameter values of the signal and a second axis representing time-based values for the parameter values;

displaying in the graph a data event that has not been eliminated; and excluding from the graph a data event that has been eliminated.

6. The method of claim 1 wherein:

the three data events of a set are comprised of a first data event having a first parameter value and a first time-based value, a second data event having a second parameter value and a second time-based value, and a third data event having a third parameter value and a third time-based value, the first time-based value being lower than the second time-based value and the second time-based value being lower than the third time-based value.

7. The method of claim 6 wherein the processing comprises:

determining a mathematically defined function between the first data event and the third data event, the mathematically defined function being in terms of parameter values and time-based values;

determining a difference of the second data event to the mathematically defined function, the difference being in terms of parameter values and time-based values; and determining whether the difference is within a predetermined threshold difference.

8. The method of claim 7 wherein the processing further comprises:

eliminating the second data event upon determining that the difference is within the predetermined threshold difference.

9. The method of claim 7 wherein the mathematically defined function is a line.

10. The method of claim 7 wherein the mathematically defined function is a logarithmic curve.

11. The method of claim 7 wherein the mathematically defined function is determined by a type of parameter and a type of signal.

12. The method of claim 6 wherein the processing comprises:

determining a first slope value for a first line connecting the first data event and the second data event, the first slope value and the first line being in terms of parameter values and time-based values;

determining a second slope value for a second line connecting the second data event and the third data event, the second slope value and the second line being in terms of parameter values and time-based values;

determining a difference in slope values between the first slope value and the second slope value, the difference in slope values being in terms of parameter values and time-based values; and determining whether the difference in slope values is within a predetermined threshold difference.

13. The method of claim 12 wherein the processing further comprises:

eliminating the second data event upon determining that the difference in slope values is within the predetermined threshold difference.

14. The method of claim 6 wherein the processing comprises:

determining a first slope value for a first line connecting the first data event and the second data event, the first slope value and the first line being in terms of parameter values and time-based values;

determining a second slope value for a second line connecting the second data event and the third data event, the second slope value and the second line being in terms of parameter values and time-based values; and determining whether the first slope value has a same sign as the second slope value.

15. The method of claim 14 wherein the processing further comprises:

eliminating the second data event upon determining that the first slope value has the same sign as the second slope value.

16. The method of claim 1 wherein the signal is an audio signal and the parameter is a gain level of the audio signal.

17. The method of claim 1 wherein the signal is a video signal and the parameter is a brightness level of the video signal.

18. The method of claim 1 wherein the signal is an audio signal and the parameter is panning level of the audio signal.

19. The method of claim 1 wherein the signal is a video signal and the parameter is a contrast level of the video signal.

20. The method of claim 1 wherein processing the sets of three data events occurs during a real-time generation of the set of data events.

21. A computer readable medium storing a computer program for editing media content, said computer program for execution by at least one processor, the computer program comprising sets of instructions for:

receiving a plurality of data events representing a parameter of a signal during a time period, each data event of the plurality of data events comprising a parameter value of the signal and a time-based value for the parameter value that corresponds to an instance in time during the time period;

receiving a user selected display preference specifying a reduced display representation that comprises a smaller set of the plurality of data events;

iteratively processing sets of three data events in the plurality of data events to identify the smaller set of data events by eliminating one of the three data events for at least one set by comparing a parameter value of one of the three data events to parameter values of the other two data events; and displaying the reduced display representation on a display interface, the reduced display representation comprising the smaller set of the plurality of data events that excludes eliminated data events.

22. The computer readable medium of claim 21 wherein the plurality of data events represent the parameter of the signal as adjusted by a user through a control interface during the time period.

23. The computer readable medium of claim 21 wherein the sets of three data events in the plurality of data events have time-based values adjacent to each other relative to the time-based values of all other data events in the plurality of data events.

24. The computer readable medium of claim 21, wherein the set of instructions for iteratively processing comprises, after eliminating a data event in a set of three data events, a set of instructions for processing the remaining two data events of the three data events that have not been eliminated and a next data event in the plurality of data events having a time-based value adjacent, relative to the time-based values of the data events in the plurality of data events that have not been eliminated, to the time-based value of one of the remaining two data events.

25. The computer readable medium of claim 21, wherein the set of instructions for displaying the reduced display representation comprises a set of instructions for displaying a graph for the reduced display representation, the graph being defined along two axes, a first axis representing parameter values of the signal and a second axis representing time-based values for the parameter values;

instructions for displaying in the graph a data event that has not been eliminated; and instructions for excluding from the graph a data event that has been eliminated.

26. The computer readable medium of claim 21 wherein:

the three data events in a set are comprised of a first data event having a first parameter value and a first time-based value, a second data event having a second parameter value and a second time-based value, and a third data event having a third parameter value and a third time-based value, the first time-based value being lower than the second time-based value and the second time-based value being lower than the third time-based value.

27. The computer readable medium of claim 26 wherein the set of instructions for processing comprises:

instructions for determining a first slope value for a first line connecting the first data event and the second data event, the first slope value and the first line being in terms of parameter values and time-based values;

instructions for determining a second slope value for a second line connecting the second data event and the third data event, the second slope value and the second line being in terms of parameter values and time-based values; and instructions for determining whether the first slope value has a same sign as the second slope value.

28. The computer readable medium of claim 27 wherein the set of instructions for processing further comprises:

instructions for eliminating the second data event upon determining that the first slope value has the same sign as the second slope value.

29. The computer readable medium of claim 26 wherein the set of instructions for processing comprises:

instructions for determining a mathematically defined function between the first data event and the third data event, the mathematically defined function being in terms of parameter values and time-based values;

instructions for determining a difference of the second data event to the mathematically defined function, the difference being in terms of parameter values and time-based values; and instructions for determining whether the difference is within a predetermined threshold difference.

30. The computer readable medium of claim 29 wherein the set of instructions for processing further comprises:

instructions for eliminating the second data event upon determining that the difference is within the predetermined threshold difference.

31. The computer readable medium of claim 29 wherein the mathematically defined function is determined by a type of parameter and a type of signal.

32. The computer readable medium of claim 29 wherein the set of instructions for processing comprises:

instructions for determining a first slope value for a first line connecting the first data event and the second data event, the first slope value and the first line being in terms of parameter values and time-based values;

instructions for determining a second slope value for a second line connecting the second data event and the third data event, the second slope value and the second line being in terms of parameter values and time-based values;

instructions for determining a difference in slope values between the first slope value and the second slope value, the difference in slope values being in terms of parameter values and time-based values; and instructions for determining whether the difference in slope values is within a predetermined threshold difference.

33. The computer readable medium of claim 32 wherein the set of instructions for processing further comprises:

instructions for eliminating the second data event upon determining that the difference in slope values is within the predetermined threshold difference.

34. The computer readable medium of claim 21 wherein the signal is an audio signal and the parameter is a gain level of the audio signal.

35. The computer readable medium of claim 21 wherein the signal is a video signal and the parameter is a brightness level of the video signal.

36. A computer readable medium storing a computer program for editing a particular content having an audio parameter, said computer program having a graphical user interface ("GUI"), said GUI comprising:

a user selectable interface tool for adjusting a gain level of the audio parameter to produce a plurality of time based parameter values representing adjustments to the gain level over a duration;

a display area for displaying a first display representation comprising a first set of data events for representing the plurality of time based parameter values; and a particular selectable display preference which when selected causes the computer program to perform an automated machine process that (i) identifies a set of data events to eliminate from the first display representation, and (ii) generates a second display representation comprising a second set of data events for alternatively representing the plurality of time based parameter values within the display area by using a smaller set of data events than the first display representation.

37. The computer readable medium of claim 36 wherein each of the plurality of time based parameter values comprises a time-based value for a value of the parameter, the time-based value corresponding to an instance in time during a time period.

38. The computer readable medium of claim 37 wherein the second set of data events comprises a peaks-only representation for the plurality of time based parameter values, the peaks-only representation being in terms of parameter values and time-based values.

39. The computer readable medium of claim 38 wherein the peaks-only representation comprises displaying a data event for a highest parameter value in a set of time based parameter values with increasing parameter values and a data event for a lowest parameter value in a set of time based parameter values with decreasing parameter values.

40. The computer readable medium of claim 37 wherein the second display representation produces a simplified representation of the plurality of time based parameter values by eliminating one of three data time based parameter values based in part on parameter values of the three time based parameter values relative to each other.

41. The computer readable medium of claim 36, wherein the computer program stores the plurality of time based parameter values in order to switch between the first and second display representations based on subsequent selections of the particular selectable display preference.

42. A computer readable medium of a computer system storing a computer program for editing a particular content, said computer program for execution on a computer system, said computer program having a graphical user interface ("GUI"), the GUI comprising:

a first display area for displaying the particular content, the particular content having a particular parameter for at least one of a video signal and audio signal represented by a plurality of time based parameter values;

at least one user selectable tool for editing the particular content;

a second display area for displaying at least (i) a first display representation comprising a first set of data events for representing the plurality of time based parameter values and (ii) a second display representation comprising a second set of data events for representing the plurality of time based parameter values with fewer data events than the first display representation; and a particular selectable display preference which when selected toggles between displaying at least the first display representation and the second display representation within the second display area, wherein the GUI retains the plurality of time based parameter values in a storage device of the computer system in order to switch the display of the second display area between the first display representation and the second display representation when a user changes the display preference.

43. The computer readable medium of claim 42 wherein the first display representation models the plurality of time based parameter values with greater accuracy than the second display representation, and wherein the first display representation requires greater processing power from the computer system to display the first set of data events than to display the second set of data events of the second display representation.

44. The computer readable medium of claim 42, wherein the GUI further comprises a user interface tool for adjusting data events of said representations.

45. For a media editing application stored on a computer readable medium, said media editing application for execution by a processor, a method for specifying a graphical user interface (GUI) of the media editing application to edit media content having an audio parameter, the method comprising:

providing a user selectable interface tool for adjusting a gain level of the audio parameter to produce a plurality of time based parameter values representing adjustments to the gain level over a duration;

providing a user selectable setting for graphing the plurality of parameter values within a display area of the media content editing application;

providing an automated machine process which performs:

(i) a first process to produce a first display representation comprising a first set of data events for representing the plurality of parameter values within the display area when the user selectable setting specifies displaying a larger set of the plurality of parameter values, and (ii) a second process to produce a second display representation comprising a smaller set of data events than the first set of data events, the second set of data events for alternatively representing the plurality of parameter values within the display area, wherein the media editing application retains the plurality of data values in a storage device in order to switch between displaying the first display representation and the second display representation during runtime operation of the media editing application.

46. The method of claim 45 wherein the second set of data events comprises displaying only data events for parameter values having a highest parameter value in a set of parameter values with increasing parameter values and parameter values with a lowest parameter value in a set of parameter values with decreasing parameter values.

47. The method of claim 45 wherein the second display representation comprises eliminating parameter values that are within a specified range of a connecting function, said connecting function connecting two non-adjacent parameter values.

48. The method of claim 45 wherein the plurality of parameter values comprise first, second, and third parameter values forming a set of adjacent parameter values, wherein performing the second process comprises:

determining a first slope value for a line connecting the first and second parameter values;

determining a second slope value for a line connecting the second and third parameter values;

using the first and second slope values to determine whether to eliminate the second parameter value.

49. The method of claim 48 wherein using the first and second slope values comprises eliminating the second parameter value when the difference between the first and second slope values is within a predetermined threshold difference.

50. The method of claim 48 wherein using the first and second slope values comprises eliminating the second parameter value when the first and second slope values both have a positive value or both have a negative value.

51. For a media editing application stored on a computer readable medium, said media editing application for execution by a processor, a method for specifying a graphical user interface (GUI) of the media editing application to edit a particular content, the method comprising:

providing a first display area for displaying the particular content, the particular content having a particular parameter for at least one of a video signal and audio signal represented by a plurality of time based parameter values;

providing at least one user selectable tool for editing the particular content;

providing a second display area for displaying at least (i) a first display representation comprising a first set of data events for representing the plurality of time based parameter values and (ii) a second display comprising a second set of data events for representing the plurality of time based parameter values with fewer data events than the first display representation; and providing a particular selectable display preference which when selected toggles between displaying at least the first display representation and the second display representation within the second display area, wherein the GUI retains all plurality of time based parameter values in a storage device in order to switch the display of the second display area between the first display representation and the second display representation when a user changes the display preference.

52. For a media editing application that edits content with an associated volume, a method comprising:

providing a display area for displaying a first representation comprising a first set of data events representing a plurality of time based volume values for the volume over a duration; and providing a user interface tool which when selected causes an automated process of the media editing application (i) to produce a second representation comprising a second set of data events representing the plurality of time based volume values with fewer data events than the first representation, and (ii) to display the second representation within the display area while storing the plurality of time based volume values in order reproduce the first representation within the display upon a subsequent selection of the user interface tool.

53. The method of claim 52, wherein providing the user interface tool comprises (i) analyzing the plurality of time based values and (ii) eliminating at least one time based value that is located within a series of consecutive increasing or decreasing time based values in order to generate the second set of data events for the second representation.

54. The method of claim 52, wherein providing the user interface tool comprises (i) analyzing the plurality of time based values and (ii) eliminating a time based value that does not fall within a threshold defined by at least two neighboring time based values in order to generate the second set of data events for the second representation.

55. A computer readable medium storing a computer program for editing content with an associated volume, the program comprising set of instruction for:

providing a display area for displaying a first representation comprising a first set of data events representing a plurality of time based volume values for the volume over a duration; and providing a user interface tool which when selected causes an automated process of the media editing application (i) to produce a second representation comprising a second set of data events representing the plurality of time based volume values with fewer data events than the first representation, and (ii) to display the second representation within the display area while storing the plurality of time based volume values in order reproduce the first representation within the display upon a subsequent selection of the user interface tool.

56. A computer readable medium storing a computer program for editing content having a particular parameter for at least one of a video signal and audio signal, said computer program comprising a graphical user interface ("GUI"), said GUI comprising:

a user interface tool for defining a plurality of parameter values for the particular parameter at different instances in time associated with playback of the content;

a display area for displaying a first display representation comprising a first set of data events for representing the plurality of parameter values; and a particular selectable display preference from which a user selects one of at least two display preferences to cause the display area to display a second display representation comprising a smaller set of the first set of data events than the first display representation, wherein the particular selectable display preferences causes the display area to display the second display representation by configuring a process that eliminates parameter values that are within a specified range of a connecting function, said connecting function connecting two non-adjacent parameter values.

57. The computer readable medium of claim 56, wherein the user interface tool for defining the plurality of parameter values comprises adjusting gain levels related to an audio parameter of the particular content.

58. The computer readable medium of claim 56, wherein the first display representation exceeds a particular display threshold of the GUI and the second display representation satisfies the particular display threshold.

59. The computer readable medium of claim 58, wherein the particular display threshold of the GUI identifies a real-time processing ability of the computer program.

60. The computer readable medium of claim 56, wherein the particular selectable display preferences causes the display area to display the second display representation by configuring a process that analyzes the plurality of parameter values and displays only data events for a highest parameter value in a set of parameter values with increasing parameter values and parameter values with a lowest parameter value in a set of parameter values with decreasing parameter values.

61. The computer readable medium of claim 56, wherein the connecting function is a line.

62. The computer readable medium of claim 56, wherein the connecting function is a logarithmic curve.

63. A computer readable medium storing a computer program for editing a particular content having a particular parameter for at least one of a video signal and audio signal represented by a plurality of time based parameter values, said computer program having a graphical user interface ("GUI"), the GUI comprising:

a first display area for displaying the particular content;

at least one tool for editing the particular content;

a second display area for displaying a plurality of display representations for the plurality of time based parameter values; and a particular selectable display preference comprising a plurality of selectable options, each option for producing a different display representation comprising different sets of data events for representing the plurality of time based parameter values within the second display area, the different display representations comprising at least two of (i) a first set of data events representing the full set of the plurality of data values, (ii) a second set of data events representing a first subset of the plurality of data values, and (iii) a third set of data events representing a second subset of the plurality of data values, wherein the first subset comprises a greater number of time based parameter values than the second subset but fewer time based parameter values than the full set of the plurality of time based parameter values, said particular selectable display preference for switching between the different display representations in the second display area at any time during operation of the GUI.

64. The computer readable medium of claim 63, wherein the second set of data events represents a reduced display representation of the plurality of time based parameter values and the third set of data events represents a peaks-only representation of the plurality of time based parameter values.

* * * * *

UNITED STATES PATENT AND TRADEMARK OFFICE

CERTIFICATE OF CORRECTION

PATENT NO. : 7,610,553 B1
APPLICATION NO. : 10/407976
DATED : October 27, 2009
INVENTOR(S) : Jacklin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Twelfth Day of October, 2010

David J. Kappos

*Director of the United States Patent and Trademark Office*